US012728778B2

(12) United States Patent
Baba et al.

(10) Patent No.: US 12,728,778 B2
(45) **Date of Patent: *Sep. 8, 2026**

(54) SEAT FRAME

(71) Applicant: TS TECH CO., LTD., Saitama (JP)

(72) Inventors: Hiroshi Baba, Tochigi (JP); Yuki Hosokawa, Tochigi (JP); Takaya Kurisu, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 118 days.

This patent is subject to a terminal disclaimer.

(21) Appl. No.: 18/789,790

(22) Filed: Jul. 31, 2024

(65) Prior Publication Data

US 2024/0383388 A1 Nov. 21, 2024

Related U.S. Application Data

(63) Continuation of application No. 18/467,769, filed on Sep. 15, 2023, now Pat. No. 12,077,078, which is a (Continued)

(30) Foreign Application Priority Data

Aug. 9, 2016 (JP) ................................ 2016-156889

(51) Int. Cl.

*B60N 2/42* (2006.01)
*B60N 2/427* (2006.01)
*B60N 2/68* (2006.01)

(52) U.S. Cl.

CPC ................ *B60N 2/68* (2013.01); *B60N 2/42* (2013.01); *B60N 2/427* (2013.01); (Continued)

(58) Field of Classification Search

CPC . B60N 2/66; B60N 2/68; B60N 2/682; B60N 2/686; B60N 2/42745; (Continued)

(56) References Cited

U.S. PATENT DOCUMENTS 5,499,863 A 3/1996 Nakane et al.
10,086,792 B1 10/2018 Watanabe
(Continued)

FOREIGN PATENT DOCUMENTS

DE 102011080067 A1 7/2012
EP 1057689 A2 12/2002
(Continued)

OTHER PUBLICATIONS

Office Action issued in related application JP 2017-154541, Mar. 30, 2021, with machine generated English language translation, 8 pages.

*Primary Examiner* — Rodney B White
(74) *Attorney, Agent, or Firm* — Michael Best & Friedrich LLP

(57) ABSTRACT

To reduce the weight of a cross member bridged between right and left sides of a seat frame. A seat frame includes an upper frame forming an upper portion of a seat back frame, and a cross member bridged at the upper frame. The cross member includes right and left end portions in a seat width direction, the right and left end portions being fixed to the upper frame; and a first recessed portion that is recessed upward or downward and provided between the right and left end portions. The first recessed portion is provided at a center portion of the cross member in the seat width direction.

20 Claims, 27 Drawing Sheets

Related U.S. Application Data continuation of application No. 17/550,075, filed on Dec. 14, 2021, now Pat. No. 11,794,619, which is a continuation of application No. 16/323,986, filed as application No. PCT/JP2017/028846 on Aug. 8, 2017, now abandoned.

(52) U.S. Cl.
CPC ......... *B60N 2/42745* (2013.01); *B60N 2/686* (2013.01); *B60N 2/42709* (2013.01); *B60N 2/682* (2013.01)

(58) Field of Classification Search
CPC ...... B60N 2/4235; B60N 2/897; B60N 2/427; B60N 2/4221; B60N 2/4228; B60N 2/42709; B60N 2/643; B60N 2/986
See application file for complete search history.

(56) References Cited

U.S. PATENT DOCUMENTS

| | | | |
|---|---|---|---|
| 11,590,866 | B2 | 2/2023 | Onuma |
| 11,794,619 | B2 * | 10/2023 | Baba ...................... B60N 2/427 |
| 12,077,078 | B2 * | 9/2024 | Baba .................. B60N 2/42745 |
| 2004/0227389 | A1 | 11/2004 | Yoshida |
| 2008/0265639 | A1 | 10/2008 | Siegrist et al. |
| 2012/0037279 | A1 | 2/2012 | Fujita et al. |
| 2012/0049587 | A1 | 3/2012 | Suzuki et al. |
| 2012/0049597 | A1 | 3/2012 | Brewer et al. |
| 2012/0169107 | A1 | 7/2012 | Sakkinen et al. |
| 2012/0193954 | A1 | 8/2012 | Sakkinen et al. |
| 2012/0193965 | A1 | 8/2012 | Saveski et al. |
| 2013/0069415 | A1 | 3/2013 | Yasuda et al. |
| 2013/0161992 | A1 | 6/2013 | Zekavica et al. |
| 2014/0110986 | A1 | 4/2014 | Yamaguchi et al. |
| 2015/0091346 | A1 | 4/2015 | Kitou |
| 2015/0210195 | A1 | 7/2015 | Fujita et al. |
| 2015/0306985 | A1 | 10/2015 | Kimura |
| 2015/0306999 | A1 | 10/2015 | Awatani |
| 2015/0308477 | A1 | 10/2015 | Arashi |
| 2016/0059743 | A1 | 3/2016 | Tsuji |
| 2016/0207428 | A1 | 7/2016 | Kim et al. |
| 2017/0008432 | A1 | 1/2017 | Matsui et al. |
| 2017/0096082 | A1 | 4/2017 | Kurihara et al. |
| 2017/0313227 | A1 | 11/2017 | Akaike et al. |
| 2018/0126886 | A1 | 5/2018 | Line et al. |
| 2018/0170226 | A1 | 6/2018 | Furukawa et al. |
| 2018/0186257 | A1 | 7/2018 | Kondrad et al. |
| 2018/0201169 | A1 | 7/2018 | Hashimoto et al. |
| 2018/0215295 | A1 | 8/2018 | Onuma et al. |
| 2018/0290569 | A1 | 10/2018 | Kijima et al. |
| 2020/0039403 | A1 | 2/2020 | Onuma |
| 2020/0254912 | A1 | 8/2020 | Fujita et al. |
| 2021/0245634 | A1 | 8/2021 | Bittermann et al. |
| 2022/0402417 | A1 | 12/2022 | Baba et al. |
| 2023/0202355 | A1 | 6/2023 | Tachikawa et al. |

FOREIGN PATENT DOCUMENTS

| | | | |
|---|---|---|---|
| JP | H04-057432 | U | 5/1992 |
| JP | H07-031526 | A | 2/1995 |
| JP | 2008-068634 | A | 3/2008 |
| JP | 2012-046055 | A | 3/2012 |
| JP | 2013-506595 | A | 2/2013 |
| JP | 2014-008842 | A | 1/2014 |
| JP | 2012-071751 | A | 4/2014 |
| JP | 2015-067168 | A | 4/2015 |
| WO | 2004/086909 | A1 | 10/2004 |
| WO | 2014/033964 | A1 | 3/2014 |

* cited by examiner

SEAT FRAME

CROSS-REFERENCE TO RELATED APPLICATIONS

This application is a continuation of U.S. patent application Ser. No. 18/467,769 (now U.S. Pat. No. 12,077,078), filed on Sep. 15, 2023, which is a continuation of U.S. patent application Ser. No. 17/550,075 (now U.S. Pat. No. 11,794,619), filed on Dec. 14, 2021, which is a continuation of U.S. patent application Ser. No. 16/323,986, filed on Feb. 7, 2019, which is a National Stage Entry application of PCT Application No. PCT/JP2017/028846, filed Aug. 8, 2017, which claims the priority benefit of Japanese Patent Application No. JP 2016-156889, filed on Aug. 9, 2016 and PCT Application No. PCT/JP2017/013793, filed Mar. 31, 2017, the contents of each being incorporated herein by reference.

BACKGROUND

The present disclosure relates to a seat frame of a vehicle seat, and particularly relates to a seat frame configured so that the weight thereof can be reduced.

Weight reduction has been demanded for a seat frame forming a framework of a seat mounted on a conveyance such as an automobile. For example, in Japanese Patent Publication JP 2015-067168, a thin plate-shaped frame is used for a side frame forming a side portion of a seat frame, and in this manner, the weight of the frame is reduced.

Some frames are configured such that a cross member bridged between right and left sides is provided at an upper portion of a seat back frame. Weight reduction in such a cross member is also an issue.

SUMMARY

The present disclosure has been made in view of the above-described problem, and an embodiment of the present disclosure provides a seat frame configured so that the weight of a cross member bridged between right and left sides of the seat frame can be reduced.

According to an embodiment, the above-described problem is solved by a seat frame of a vehicle seat, which includes an upper frame forming an upper portion of a seat back frame and a cross member bridged at the upper frame. The cross member includes right and left end portions in a seat width direction, the right and left end portions being fixed to the upper frame; and a first recessed portion that is recessed upward or downward and provided between the right and left end portions. According to the above-described seat frame, the weight of the cross member can be reduced as compared to the case of providing no recessed portion at the cross member. Thus, the weight of the cross member bridged between right and left sides of the seat frame can be reduced.

In the above-described seat frame, the first recessed portion is preferably provided at a center portion of the cross member in the seat width direction. The first recessed portion is provided at a position facing an occupant as described above, and therefore, a feeling of sitting on the seat can be improved. Moreover, according to the above-described seat frame, a space where a member is arranged can be provided in the vicinity of the center portion of the cross member.

In the above-described seat frame, the cross member preferably includes a reinforcement portion formed at the first recessed portion. With this configuration, lowering of the stiffness of the vicinity of the first recessed portion of the cross member can be suppressed.

In the above-described seat frame, the cross member preferably includes wide portions provided on right and left sides of the first recessed portion in the seat width direction, and the reinforcement portion is preferably formed across the first recessed portion and both of the wide portions. With this configuration, the stiffness of the cross member can be improved.

In the above-described seat frame, the cross member is preferably provided with a through-hole. With this configuration, the weight of the cross member can be further reduced.

In the above-described seat frame, the through-hole is preferably formed at each wide portion. The through-hole is formed at the wide portion as described above, and therefore, a larger through-hole can be formed as compared to the case of forming the through-hole at the first recessed portion. Thus, the weight of the cross member can be further reduced.

In the above-described seat frame, the through-hole is preferably formed at the reinforcement portion at each wide portion. With this configuration, weight reduction in the cross member can be realized, and lowering of the stiffness of the cross member can be also suppressed.

In the above-described seat frame, at least part of each wide portion is preferably curved to protrude backward. With this configuration, the stiffness of the cross member can be improved. Moreover, the cross member can be formed in a shape matching the body shape of the occupant, and therefore, the feeling of sitting on the seat can be improved.

In the above-described seat frame, the seat frame preferably further includes a second recessed portion different from the first recessed portion, the second recessed portion being provided at least at one of an upper or lower end of the cross member. With this configuration, the weight of the cross member can be further reduced. Moreover, a member such as a cover stop member can be stopped at the second recessed portion. Thus, the number of components forming the seat can be reduced. Consequently, the weight of the seat can be reduced.

In the above-described seat frame, the seat frame preferably further includes a flange portion provided at least at one of the upper or lower end of the cross member. The flange portion is preferably formed at a position facing the first recessed portion in an upper-to-lower direction. With this configuration, lowering of the stiffness of the first recessed portion can be suppressed.

According to an embodiment, the weight of the cross member bridged between the right and left sides of the seat frame can be reduced. According to an embodiment, the feeling of sitting on the seat can be improved. According to an embodiment, lowering of the stiffness of the vicinity of the first recessed portion of the cross member can be suppressed. According to an embodiment, the stiffness of the cross member can be improved. According to an embodiment, a larger through-hole can be formed at the cross member. According to an embodiment, weight reduction in the cross member can be realized, and lowering of the stiffness of the cross member can be suppressed. According to an embodiment, the number of components forming the seat can be reduced.

BRIEF DESCRIPTION OF DRAWINGS

FIG. 6B is a rear view of the second coupling bracket of FIG. 4.

DETAILED DESCRIPTION

Hereinafter, a seat frame 1 according to an embodiment (hereinafter referred to as a "present embodiment") of the present disclosure is described with reference to FIGS. 1 to 18. The seat frame 1 forms a framework of a vehicle seat mounted on a vehicle. Note that the embodiments described below are set forth merely as examples for the sake of easy understanding of the present disclosure, and are not intended to limit the embodiments. That is, changes and modifications can be made to the shapes, dimensions, arrangements, etc. of members described below without departing from the gist of the present disclosure, and needless to say, the invention includes equivalents thereof.

In the description below, a "front-to-rear direction" means a front-to-rear direction as viewed from a seated person on the vehicle seat, and is a direction coincident with a traveling direction of the vehicle. A "seat width direction" means a horizontal width direction of the vehicle seat, and is coincident with a right-to-left direction as viewed from the seated person on the vehicle seat. Moreover, an "upper-to-lower direction" means a height direction of the vehicle seat, and is coincident with an upper-to-lower direction when the vehicle seat is viewed from the front.

Outline of Seat Frame 1

Figure 1:
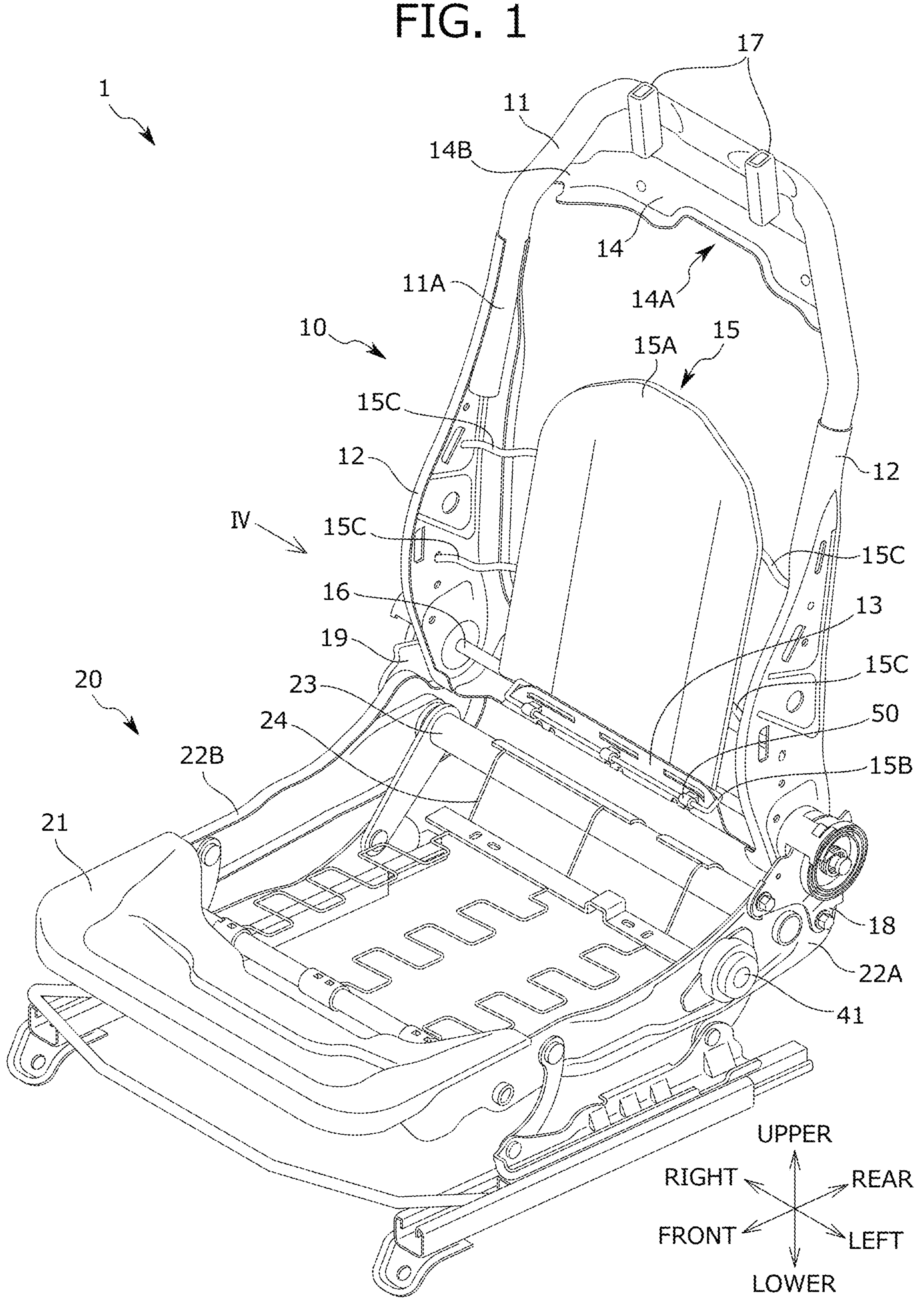
FIG. 1 is a perspective view of a seat frame according to the present embodiment.

First, an outline of a configuration of the seat frame 1 is described with reference to FIG. 1. As illustrated in FIG. 1, the seat frame 1 mainly includes a seat back frame 10 and a seat cushion frame 20. The seat back frame 10 forms a framework of a backrest portion of the seat frame 1, and the seat cushion frame 20 forms a framework of a seating portion of the seat frame 1.

As illustrated in FIG. 1, the seat back frame 10 includes an inverted U-shaped upper frame 11, a pair of side frames 12 forming right and left end portions in the seat width direction, and a lower frame 13 coupling lower end portions of the pair of side frames 12.

The upper frame 11 is welded to the side frames 12 at upper frame side portions 11A forming both lower portions of the upper frame 11. Moreover, headrest attachment portions 17 are, by welding, attached to an upper end of the upper frame 11. The headrest attachment portions 17 are tubular bodies into which two headrest stays hanging down from a not-shown headrest are inserted.

A cross member 14 is bridged between both end portions of the upper frame 11 above the upper frame side portions 11A. Right and left end portions 14B of the cross member 14 are welded and fixed to right and left bent portions of the upper frame 11. Note that the bent portion of the upper frame 11 is a portion of the upper frame 11 coupling a portion attached to the headrest attachment portion 17 and a portion attached to the side frame 12. In the case of demanding weight reduction, a recessed portion 14A recessed upward of the seat is formed between the right and left end portions 14B of the cross member 14. Specifically, the recessed portion 14A is formed at a center portion of the cross member 14 in the seat width direction. In other words, the recessed portion 14A is provided between the right and left headrest attachment portions 17. As described above, the recessed portion 14A is formed at the cross member 14 of the seat frame 1, and in this manner, the weight of the seat frame 1 is reduced. Note that the recessed portion 14A is formed at a lower end of the cross member 14, but may be formed at an upper end. In the case of forming the recessed portion 14A at the upper end, the recessed portion 14A is a portion recessed downward of the seat. Alternatively, the recessed portion 14A may be formed at each of the upper and lower ends of the cross member 14.

As illustrated in FIG. 1, a rotary shaft 16 for reclining units 40 is attached between the lower end portions of the right and left side frames 12 with the rotary shaft 16 penetrating the right and left side frames 12. Note that a reclining operation section is operated to operate the reclining units 40, and in this manner, the angle of the seat back frame 10 with respect to the seat cushion frame 20 can be adjusted.

A pressure receiving member 15 configured to receive a load from an occupant is bridged at a center portion of the seat back frame 10. The pressure receiving member 15 described herein includes a support portion 15A, a wire 15B, and wires 15C. The support portion 15A is configured to support the back of the occupant, and includes an elastic member such as a plate spring or an S-spring, for example. Note that a surface of the support portion 15A at the front of the seat is referred to as a "support surface." The wire 15B is stopped at the support portion 15A and a front wall portion 13B of the lower frame 13. Specifically, the wire 15B is stopped at the front wall portion 13B of the lower frame 13 by means of clips 50 fitted in through-holes formed at the front wall portion 13B. The wires 15C are stopped at side portions of the support portion 15A and the side frames 12. As described above, the support portion 15A is fixed to the seat back frame 10 with the wire 15B and the wires 15C.

Next, the seat cushion frame 20 is described. As illustrated in FIG. 1, the seat cushion frame 20 is in an outer square frame shape as viewed from above. Moreover, the seat cushion frame 20 includes, as main components, cushion side frames 22A, 22B each formed at right and left end portions in the seat width direction, a pan frame 21 forming a front end portion of the seat cushion frame 20, and a coupling pipe 23 coupling the right and left cushion side frames 22A, 22B. For example, the coupling pipe 23 is a hollow member such as a round pipe, and a rear end of a pressure receiving member 24 configured to support the buttocks of the occupant is attached to the coupling pipe 23.

Figure 4:
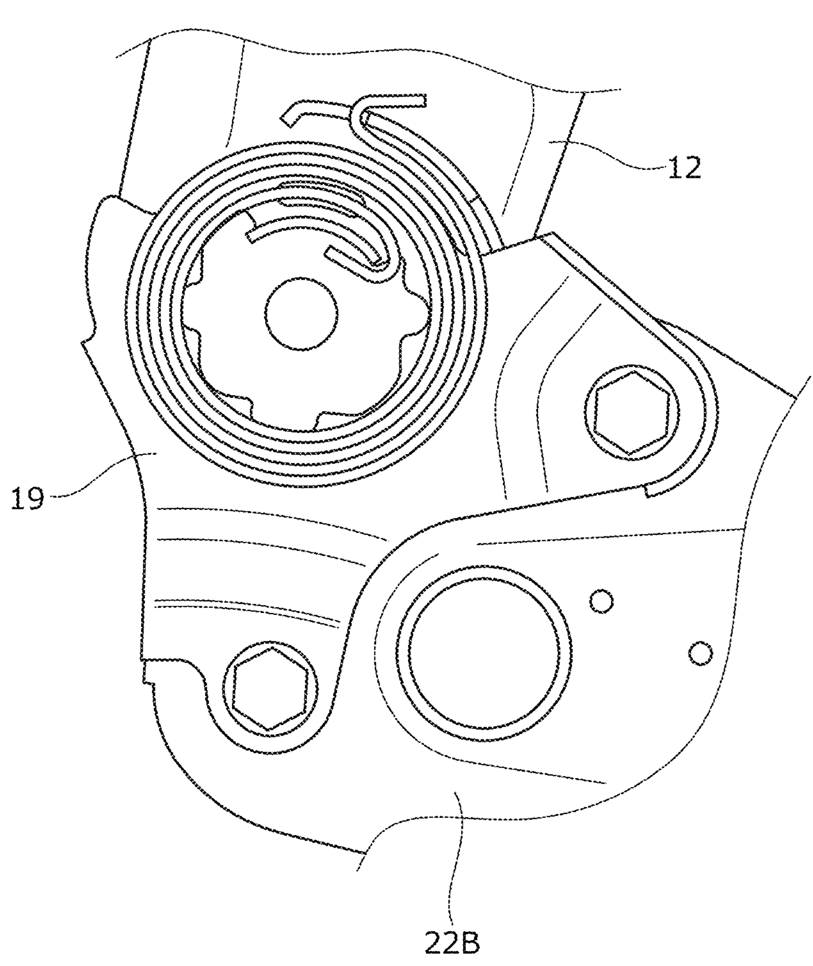
FIG. 4 is an enlarged partial view of the periphery of a second coupling bracket from a view point IV of FIG. 1.

As illustrated in FIG. 1, a first coupling bracket 18 is attached to an upper portion of a rear end portion of the left cushion side frame 22A. Moreover, the left side frame 12 is coupled to the first coupling bracket 18 via the reclining unit 40. Moreover, as illustrated in FIG. 4, a second coupling bracket 19 is attached to an upper portion of a rear end portion of the right cushion side frame 22B. Moreover, the right side frame 12 is coupled to the second coupling bracket 19 via the reclining unit 40. Note that details of configurations of the first coupling bracket 18 and the second coupling bracket 19 are described below.

Configuration of Side Frame 12

Figure 2:
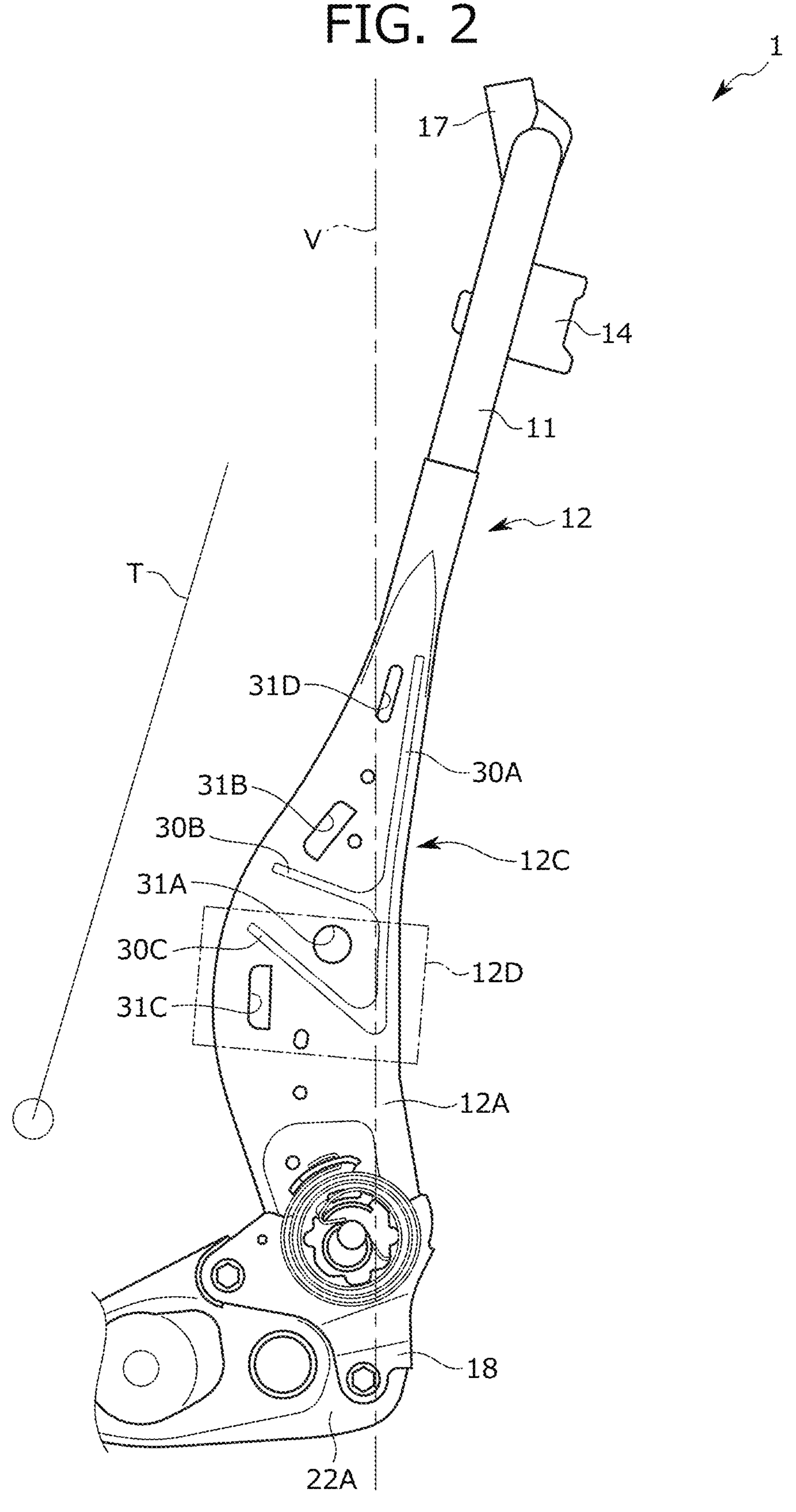
FIG. 2 is a left side view of a seat back frame.
Figure 3A:
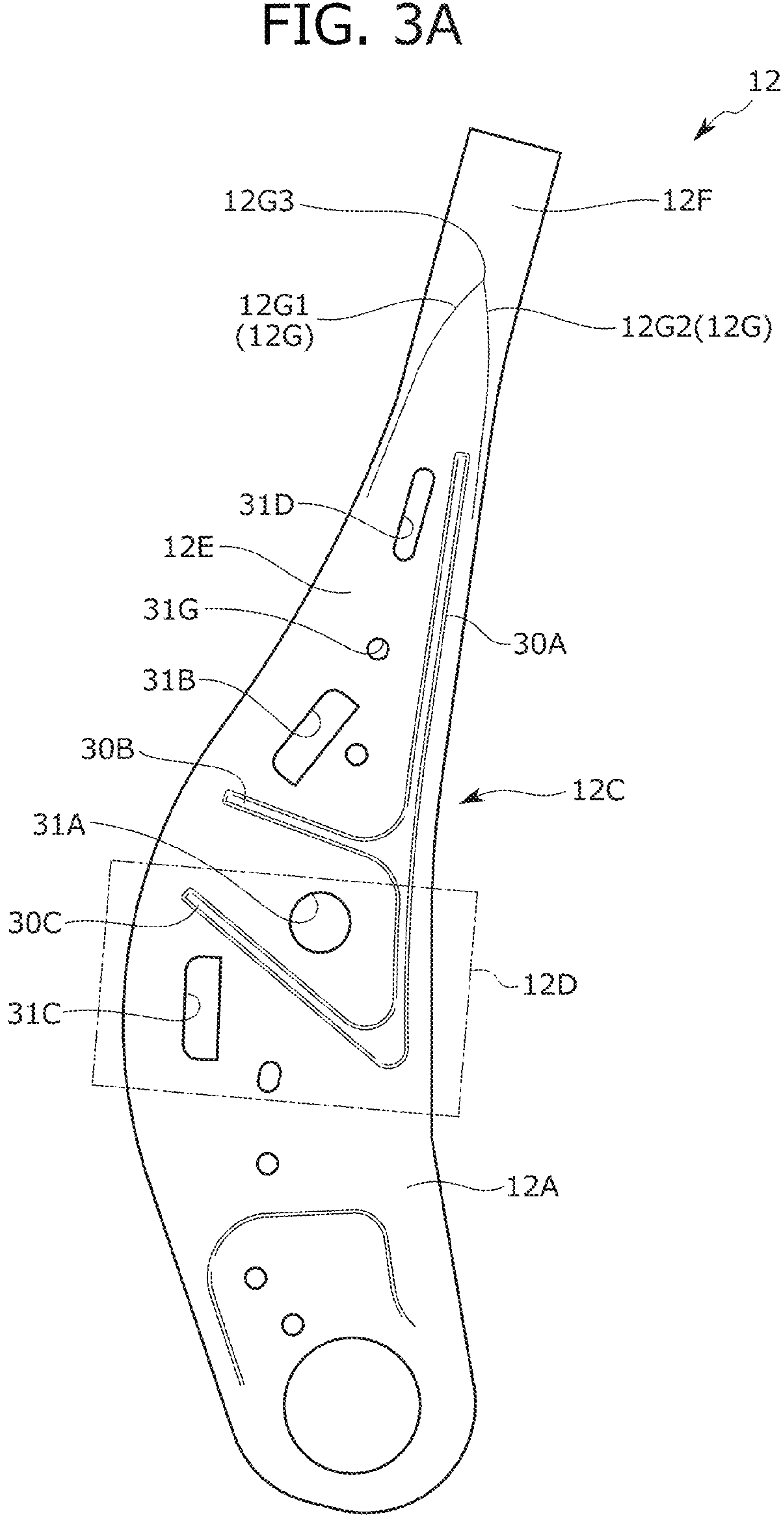
FIG. 3A is an outer side view of a side frame.
Figure 3B:
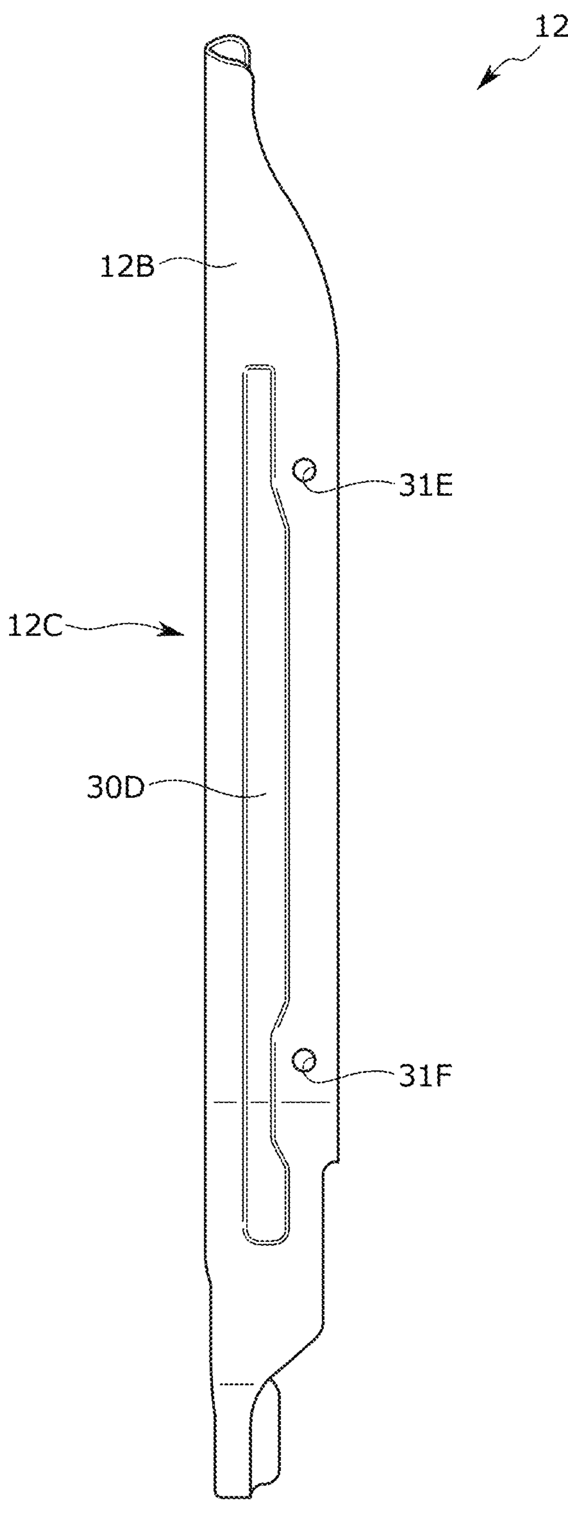
FIG. 3B is a rear view of the side frame of FIG. 3A.

Next, a configuration of the side frame 12 is described with reference to FIGS. 2, 3A, 3B, and 3C. FIG. 2 is a left side view of the seat back frame 10. FIG. 3A is an outer side view of the side frame 12, FIG. 3B is a rear view of the side frame 12, and FIG. 3C is an inner side view of the side frame 12.

Figure 3C:
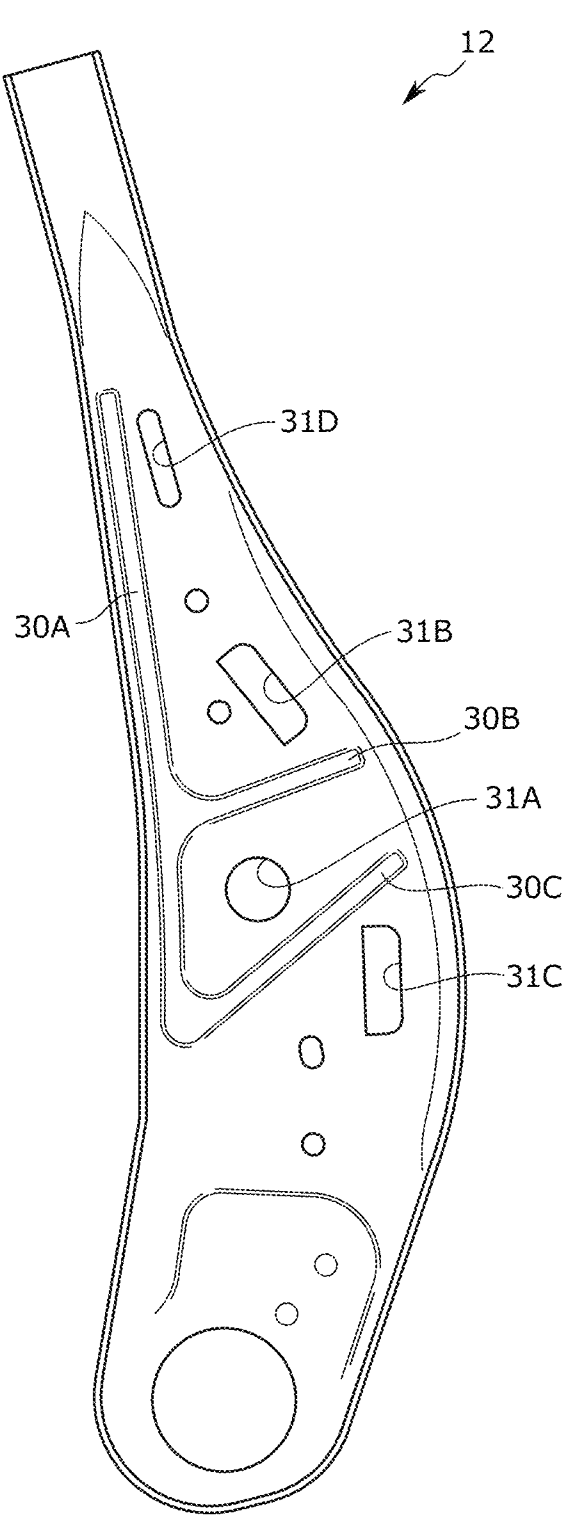
FIG. 3C is an inner side view of the side frame.

As illustrated in FIGS. 2, 3A, and 3C, a side frame side portion 12A forming a side portion of the side frame 12 is provided with multiple through-holes including an airbag attachment hole 31A, an airbag attachment hole 31B, an airbag attachment hole 31C, and a through-hole 31D. The airbag attachment hole 31A, the airbag attachment hole 31B, and the airbag attachment hole 31C are through-holes used for attachment of an airbag unit. The airbag unit described herein includes an airbag body, webbing configured to guide an airbag in a deploying direction thereof, and an airbag attachment plate, for example. For example, the airbag attachment hole 31B and the airbag attachment hole 31C are holes for attachment of the webbing of the airbag, and the airbag attachment hole 31A is a hole into which a bolt extending from a retainer of the airbag body is inserted. The through-hole 31D is formed at a position facing a lower end of the upper frame side portion 11A, and the side frame 12 and the upper frame 11 are welded to each other at the through-hole 31D.

As illustrated in FIGS. 2, 3A, and 3C, a first reinforcement portion 30A extending along a rear edge 12C of the side frame side portion 12A forming the side portion of the side frame 12 is formed at the side frame side portion 12A. Note that the rear edge 12C is a bent portion as a boundary between the side frame side portion 12A forming a side surface of the side frame 12 and a side frame rear portion 12B forming a rear surface of the side frame 12. The first reinforcement portion 30A is, for example, configured as a bead portion formed in such a manner that part of the side frame side portion 12A is recessed inward of the seat by pressing. The first reinforcement portion 30A described herein is provided at least at a wide portion 12D having the greatest width at the side frame side portion 12A. In the present embodiment, the first reinforcement portion 30A is provided along the rear edge 12C from a position facing the through-hole 31D to a position facing the airbag attachment hole 31C in the upper-to-lower direction. That is, the first reinforcement portion 30A is provided at least at a position at which the side frame 12 and the upper frame side portion 11A overlap with each other, and therefore, the strength of a joint portion between the side frame 12 and the upper frame 11 can be enhanced. Note that an upper end of the first reinforcement portion 30A may be positioned above the position of welding between the side frame 12 and the upper frame 11. Moreover, as illustrated in FIG. 2, the first reinforcement portion 30A is provided at such a position that the first reinforcement portion 30A overlaps with the upper frame 11 and the cushion side frames 22A, 22B in the upper-to-lower direction as viewed laterally.

As illustrated in FIGS. 2, 3A, and 3C, a second reinforcement portion 30B extending forward of the seat from a portion between upper and lower ends of the first reinforcement portion 30A is formed at the side frame side portion 12A forming the side portion of the side frame 12. As in the first reinforcement portion 30A, the second reinforcement portion 30B is configured as a bead portion formed in such a manner that part of the side frame side portion 12A is recessed inward of the seat by pressing. The second reinforcement portion 30B described herein is formed between the airbag attachment hole 31A and the airbag attachment hole 31B. Note that a rear end of the second reinforcement portion 30B is connected to the first reinforcement portion 30A, and the second reinforcement portion 30B and the first reinforcement portion 30A are integrated. Moreover, a front end of the second reinforcement portion 30B is positioned forward of the seat with respect to the airbag attachment hole 31B, and is positioned backward of the seat with respect to a front edge of the side frame side portion 12A.

As illustrated in FIGS. 2, 3A, and 3C, a third reinforcement portion 30C extending forward of the seat from the lower end of the first reinforcement portion 30A is formed at the side frame side portion 12A forming the side portion of the side frame 12. As in the first reinforcement portion 30A, the third reinforcement portion 30C is configured as a bead portion formed in such a manner that part of the side frame side portion 12A is recessed inward of the seat by pressing. The third reinforcement portion 30C described herein is formed between the airbag attachment hole 31A and the airbag attachment hole 31C. Note that a rear end of the third reinforcement portion 30C is connected to the first reinforcement portion 30A, and the third reinforcement portion 30C and the first reinforcement portion 30A are integrated. Moreover, a front end of the third reinforcement portion 30C is positioned forward of the seat with respect to the airbag attachment hole 31C, and is positioned backward of the seat with respect to the front edge of the side frame side portion 12A.

FIG. 2 also illustrates a vertical line V at a position overlapping with a rear end of the third reinforcement portion 30C. As illustrated in FIG. 2, the rear end of the third reinforcement portion 30C is provided forward of the cross member 14. In other words, the cross member 14 is provided at the rear of the third reinforcement portion 30C.

Moreover, as illustrated in FIG. 2, the second reinforcement portion 30B extends from the first reinforcement portion 30A at an angle (i.e., a substantially right angle) substantially perpendicular to a torso line T indicating the axis of a body of a three-dimensional mannequin (not shown) representing the occupant seating on the vehicle seat including the seat frame 1 as the framework. On the other hand, the third reinforcement portion 30C extends from the first reinforcement portion 30A at an angle (i.e., an acute angle) not perpendicular to the torso line T. That is, the second reinforcement portion 30B and the third reinforcement portion 30C are different from each other in the angle of extension from the first reinforcement portion 30A. As described above, the extension angles of the first reinforcement portion 30A, the second reinforcement portion 30B, and the third reinforcement portion 30C vary so that stiffness against load input from various directions can be enhanced. Moreover, each of the first reinforcement portion 30A, the second reinforcement portion 30B, and the third reinforcement portion 30C is, in the upper-to-lower direction, provided above the reclining unit 40.

Bottom portions (i.e., bottom portions of the beads) of the first reinforcement portion 30A, the second reinforcement portion 30B, and the third reinforcement portion 30C inside the seat are positioned outward of the seat with respect to an end portion of a flange provided at the front of the side frame 12. An upper end portion of the first reinforcement portion 30A may be narrowed as compared to a lower end portion thereof. Front end portions of the second reinforcement portion 30B and the third reinforcement portion 30C may be narrowed as compared to rear portions thereof. The front end portions of the second reinforcement portion 30B and the third reinforcement portion 30C may be positioned forward of the front wall portion 13B of the lower frame 13, the support portion 15A of the pressure receiving member 15, attachment portions of the reclining units 40, the headrest attachment portions 17, and the rotary shaft 16. Any of the first reinforcement portion 30A, the second reinforcement portion 30B, and the third reinforcement portion 30C may be positioned forward of the headrest attachment portions 17.

As illustrated in FIG. 3B, a rear reinforcement portion 30D is formed at a center portion of the side frame rear portion 12B of the side frame 12. A through-hole 31E and a through-hole 31F are each formed at upper and lower portions of the side frame rear portion 12B. The rear reinforcement portion 30D is configured as a bead portion formed in such a manner that part of the side frame rear portion 12B is recessed inward of the seat by pressing. The rear reinforcement portion 30D extends from a position facing the upper end of the first reinforcement portion 30A to a position below the lower end of the first reinforcement portion 30A. Moreover, the rear reinforcement portion 30D is formed such that an upper end of the rear reinforcement portion 30D is positioned above the through-hole 31E formed at the side frame rear portion 12B and a lower end of the rear reinforcement portion 30D is positioned below the through-hole 31F formed at the side frame rear portion 12B. A center portion of the rear reinforcement portion 30D positioned between the through-hole 31E and the through-hole 31F is a wide portion that is wider than the upper and lower ends. Moreover, the lower end of the rear reinforcement portion 30D is at a position overlapping with the lower frame 13 in the upper-to-lower direction. As described above, the rear reinforcement portion 30D is formed at the side frame rear portion 12B so that the strength of the side frame rear portion 12B can be enhanced across a broad area.

As described above, an integrated inverted F-shaped bead portion of the first reinforcement portion 30A, the second reinforcement portion 30B, and the third reinforcement portion 30C is provided at the side frame side portion 12A of the side frame 12. Thus, the strength of the side frame side portion 12A can be improved in a balanced manner across a broad area. Moreover, the first reinforcement portion 30A is provided along the rear edge 12C so that the strength of the rear edge 12C can be enhanced. Further, the first reinforcement portion 30A is provided at least at the wide portion 12D of the side frame side portion 12A, and therefore, the strength of the wide portion 12D can be enhanced even in the case of forming various through-holes for attaching components such as the airbag to the wide portion 12D. In addition, the airbag attachment hole 31A is formed at a position sandwiched in the upper-to-lower direction by the second reinforcement portion 30B and the third reinforcement portion 30C, and therefore, the strength of the periphery of the airbag attachment hole 31A can be enhanced. Moreover, the second reinforcement portion 30B is provided between the airbag attachment hole 31A and the airbag attachment hole 31B, and therefore, the strength of the periphery of the airbag attachment hole 31A and the airbag attachment hole 31B can be enhanced. Further, the third reinforcement portion 30C is provided between the airbag attachment hole 31A and the airbag attachment hole 31C, and therefore, the strength of the periphery of the airbag attachment hole 31A and the airbag attachment hole 31C can be enhanced.

Configurations of First Coupling Bracket 18 and Second Coupling Bracket 19

Next, the configurations of the first coupling bracket 18 and the second coupling bracket 19 is described with reference to FIGS. 1 and 4 to 6C.

Figure 5A:
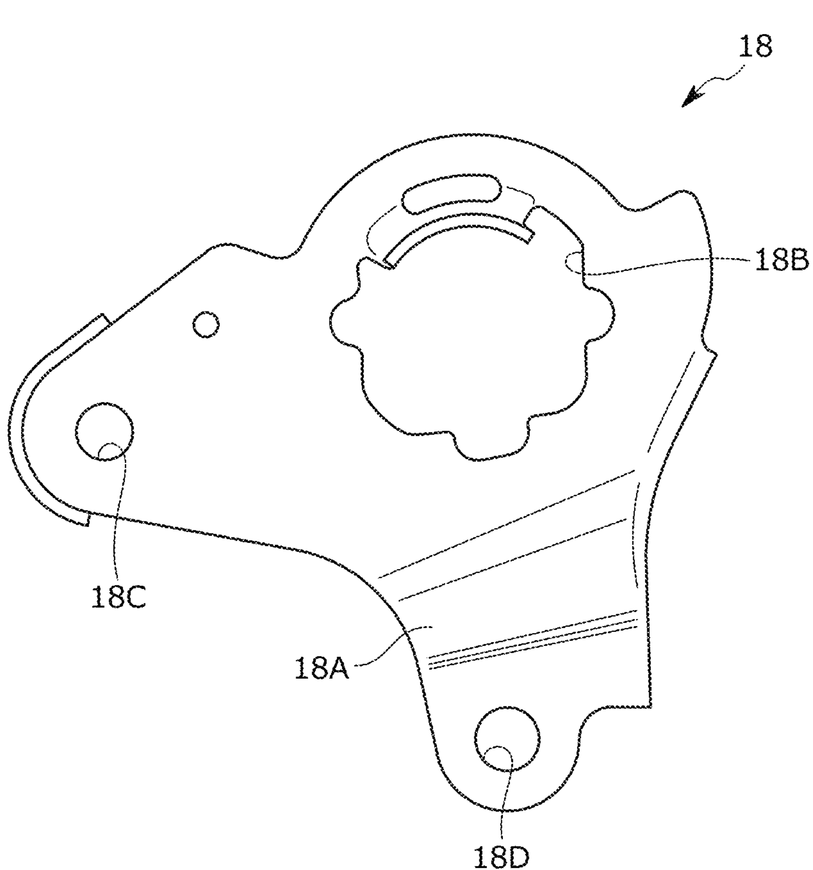
FIG. 5A is an outer side view of a first coupling bracket.
Figure 5B:
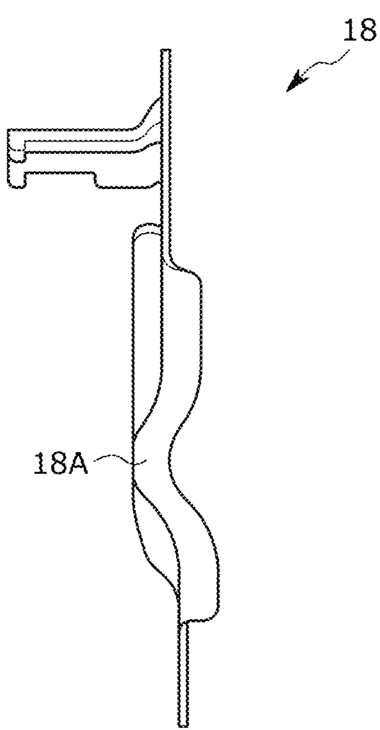
FIG. 5B is a rear view of the first coupling bracket of FIG. 5A.
Figure 5C:
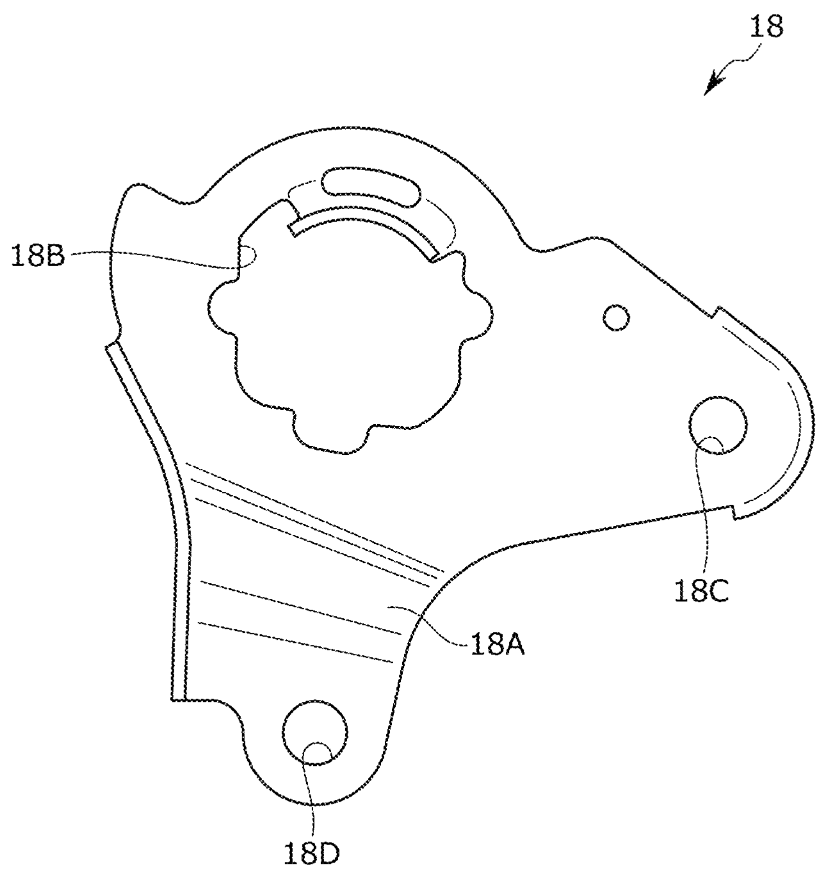
FIG. 5C is an inner side view of the first coupling bracket of FIG. 5A.
Figure 6A:
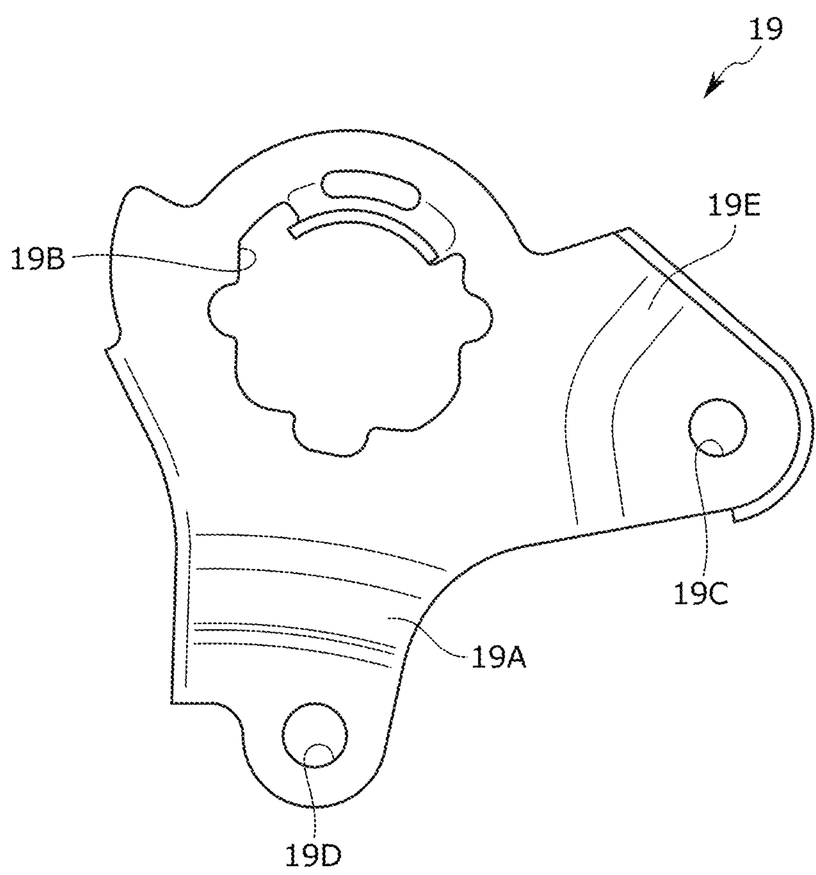
FIG. 6A is an outer side view of the second coupling bracket of FIG. 4.
Figure 6B:
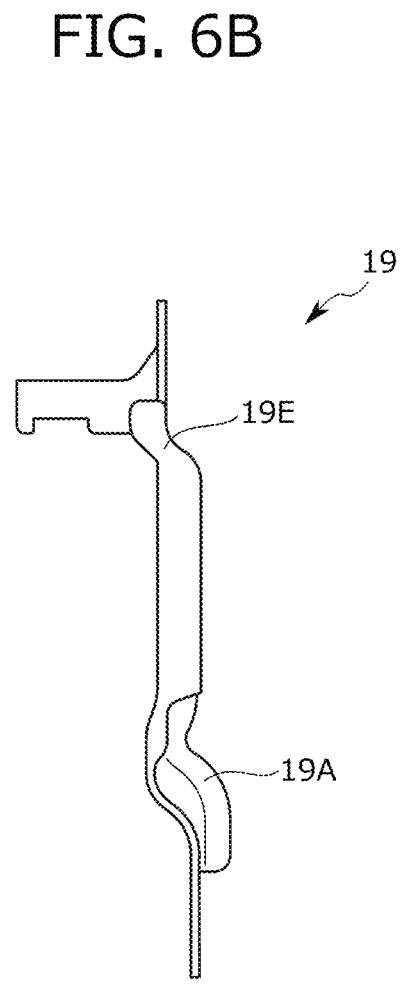
Figure 6C:
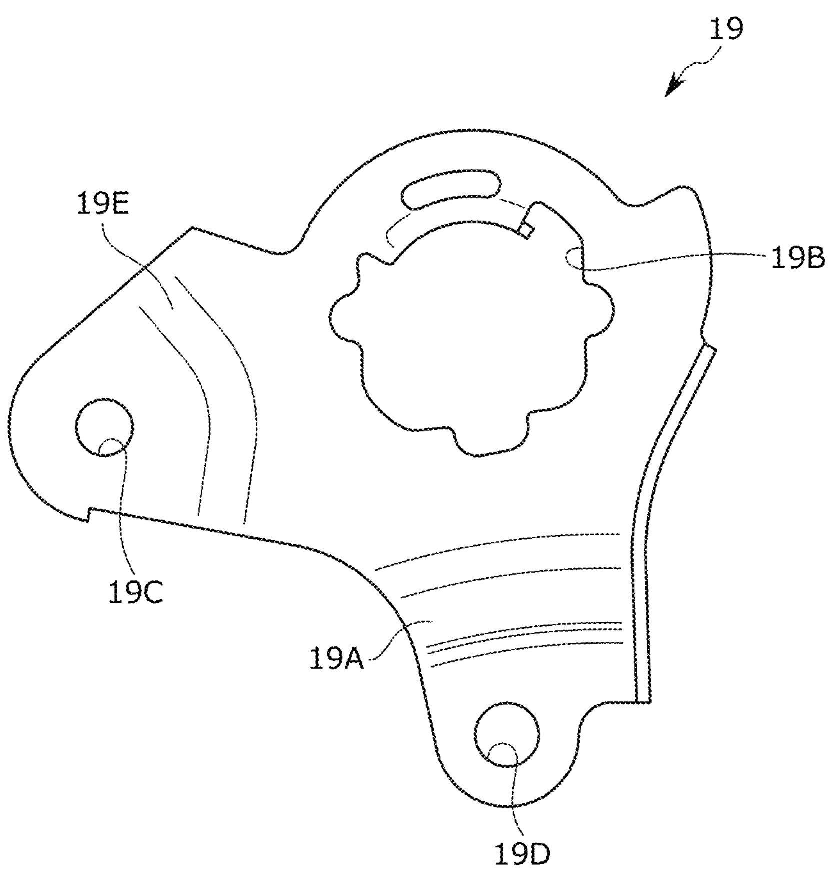
FIG. 6C is an inner side view of the second coupling bracket.

FIG. 4 is an enlarged partial view of the periphery of the second coupling bracket 19 from a view point IV of FIG. 1. FIGS. 5A, 5B, and 5C each correspond to an outer side view, a rear view, and an inner side view of the first coupling bracket 18. FIGS. 6A, 6B, and 6C each correspond to an outer side view, a rear view, and an inner side view of the second coupling bracket 19.

As illustrated in FIGS. 5A, 5B, and 5C, the first coupling bracket 18 includes a weak portion 18A, a shaft through-hole 18B, a bolt fastening hole 18C, and a bolt fastening hole 18D. The weak portion 18A is a portion provided between the shaft through-hole 18B and the bolt fastening hole 18D and bent outward of the seat. In a case where a load is input to the first coupling bracket 18, the first coupling bracket 18 is easily deformable at the weak portion 18A. The rotary shaft 16 is inserted into the shaft through-hole 18B, and the left reclining unit 40 is attached to the shaft through-hole 18B. The left side frame 12 is coupled to the first coupling bracket 18 via the left reclining unit 40. The left cushion side frame 22A is fixed to the bolt fastening hole 18C and the bolt fastening hole 18D with fastening tools such as bolts and nuts. For example, upon rear collision of the vehicle, the weak portion 18A of the first coupling bracket 18 deforms to absorb impact.

As illustrated in FIGS. 6A, 6B, and 6C, the second coupling bracket 19 includes a weak portion 19A, a shaft through-hole 19B, a bolt fastening hole 19C, a bolt fastening hole 19D, and a weak portion 19E. The weak portion 19A is a portion provided between the shaft through-hole 19B and the bolt fastening hole 19D and bent outward of the seat. In a case where a load is input to the second coupling bracket 19, the second coupling bracket 19 is easily deformable at the weak portion 19A. The rotary shaft 16 is inserted into the shaft through-hole 19B, and the right reclining unit 40 is attached to the shaft through-hole 19B. The right side frame 12 is coupled to the second coupling bracket 19 via the right reclining unit 40. The right cushion side frame 22B is fixed to the bolt fastening hole 19C and the bolt fastening hole 19D via fastening tools such as bolts and nuts. Moreover, the weak portion 19E is a portion provided between the shaft through-hole 19B and the bolt fastening hole 19C and bent outward of the seat. In a case where a load is input to the second coupling bracket 19, the second coupling bracket 19 is easily deformable at the weak portion 19E. For example, upon rear collision of the vehicle, the weak portion 19A and the weak portion 19E of the second coupling bracket 19 deform to absorb impact.

Note that regarding the weak portion 18A of the first coupling bracket 18, a first connection portion with a shaft through-hole 18B side and a second connection portion with a bolt fastening hole 18D side are at the substantially same position in the seat width direction. That is, at the first coupling bracket 18, the first connection portion and the second connection portion are not offset from each other in the seat width direction. On the other hand, regarding the weak portion 19A of the second coupling bracket 19, a second connection portion with a bolt fastening hole 19D side is, in the seat width direction, positioned inward of the seat with respect to a first connection portion with a shaft through-hole 19B side. That is, at the second coupling bracket 19, the first connection portion and the second connection portion are offset from each other in the seat width direction. Moreover, at the first coupling bracket 18, no weak portion is provided between the shaft through-hole 18B and the bolt fastening hole 18C. On the other hand, at the second coupling bracket 19, the weak portion 19E is provided between the shaft through-hole 19B and the bolt fastening hole 19C. As described above, the weak portion is provided unsymmetrically between the first coupling bracket 18 and the second coupling bracket 19, and therefore, case of deformation upon load input to the seat frame 1 is differentiated.

As illustrated in FIG. 1, a height adjustment unit 41 is provided at the left cushion side frame 22A, and a similar component is not provided at the right cushion side frame 22B. Thus, a greater load is, upon rear collision, input to the first coupling bracket 18 coupled to the left cushion side frame 22A as compared to the second coupling bracket 19 coupled to the right cushion side frame 22B. Meanwhile, at the seat frame 1, the weak portion is provided unsymmetrically between the first coupling bracket 18 and the second coupling bracket 19 as described above, and the second coupling bracket 19 is configured more easily deformable than the first coupling bracket 18. Thus, deformation of the first coupling bracket 18 and the second coupling bracket 19 can be adjusted to the same level.

Configuration of Lower Frame 13

Figure 7:
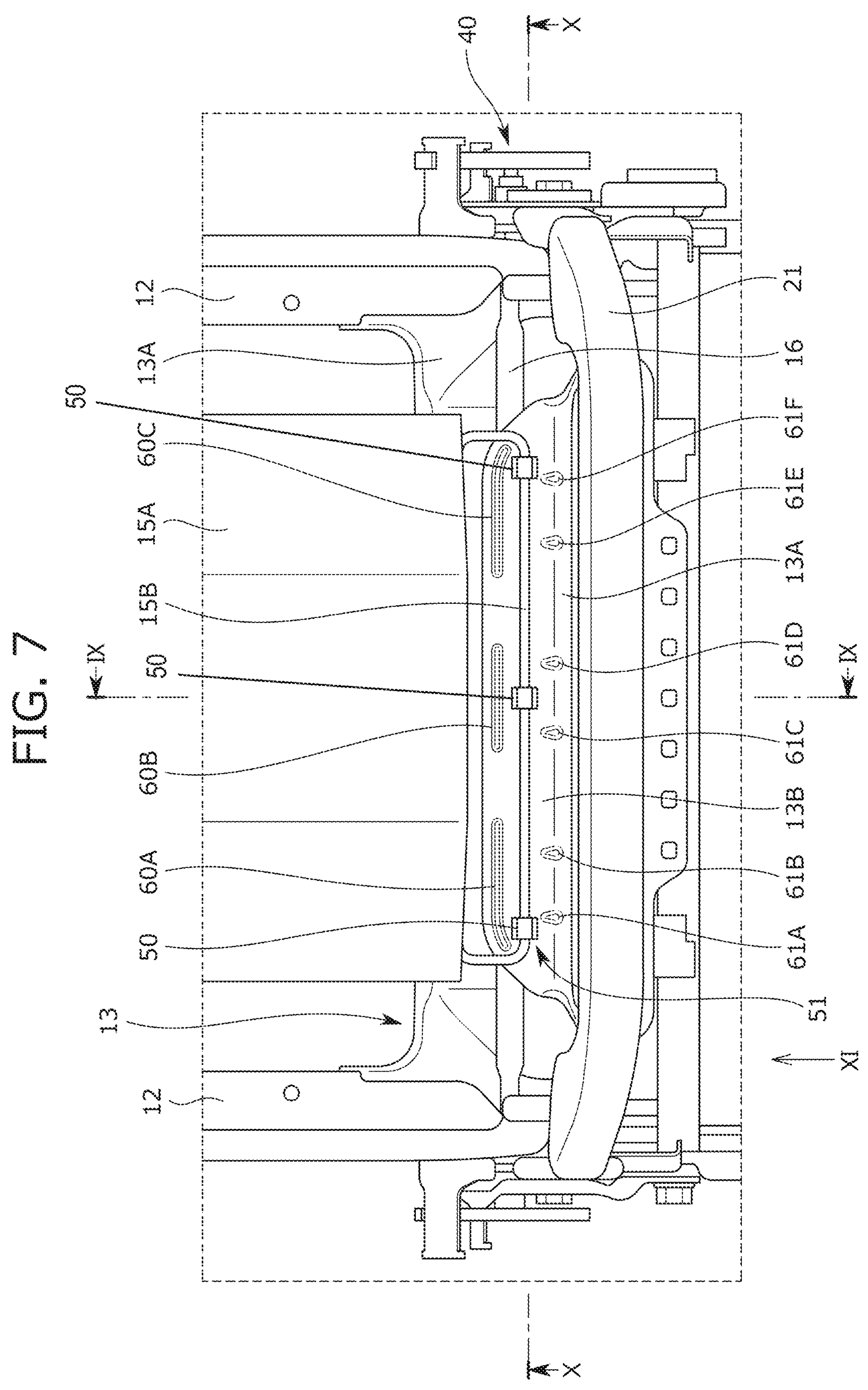
FIG. 7 is an enlarged partial view of a front side of the seat frame.
Figure 8:
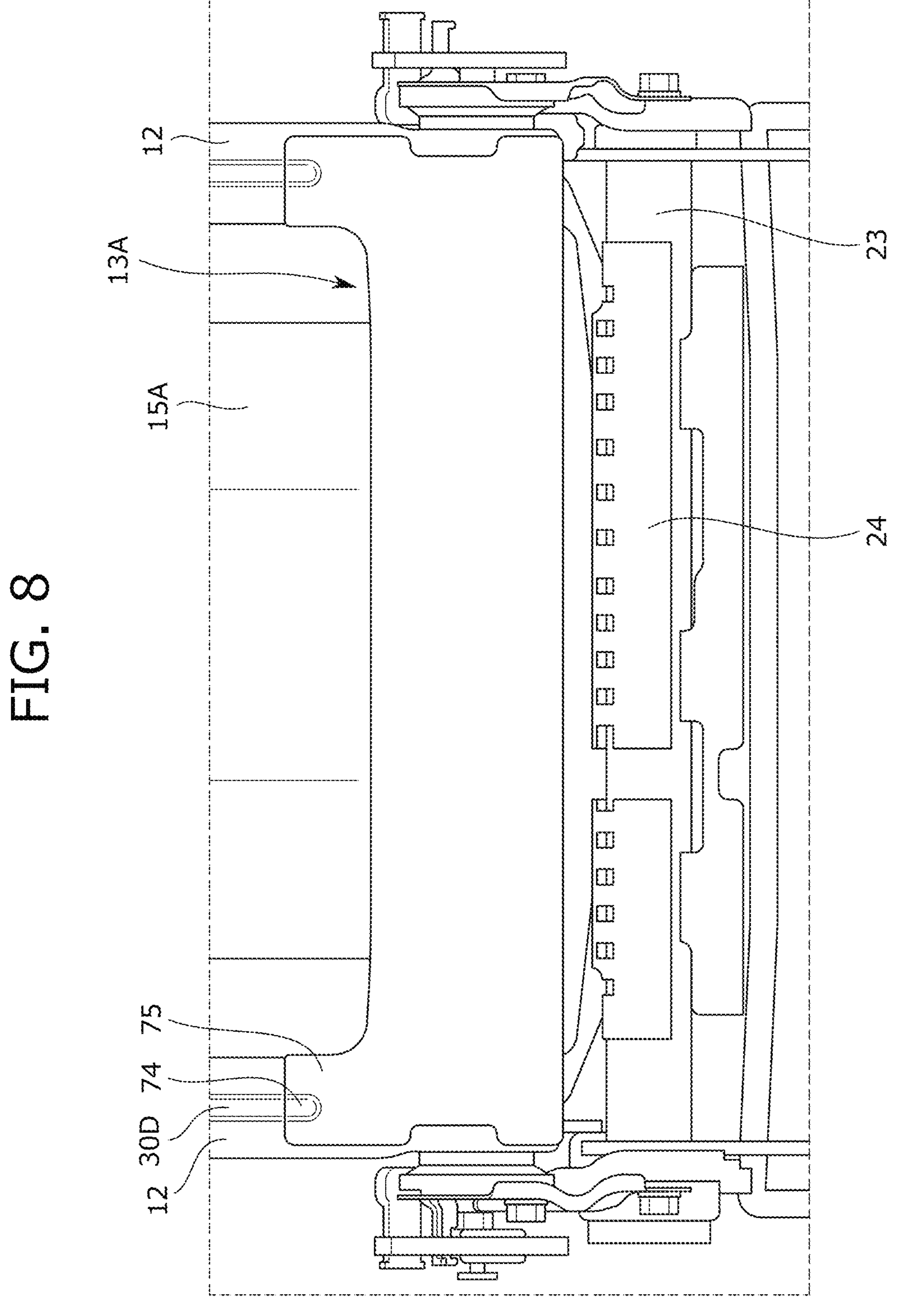
FIG. 8 is an enlarged partial view of a rear side of the seat frame.
Figure 9:
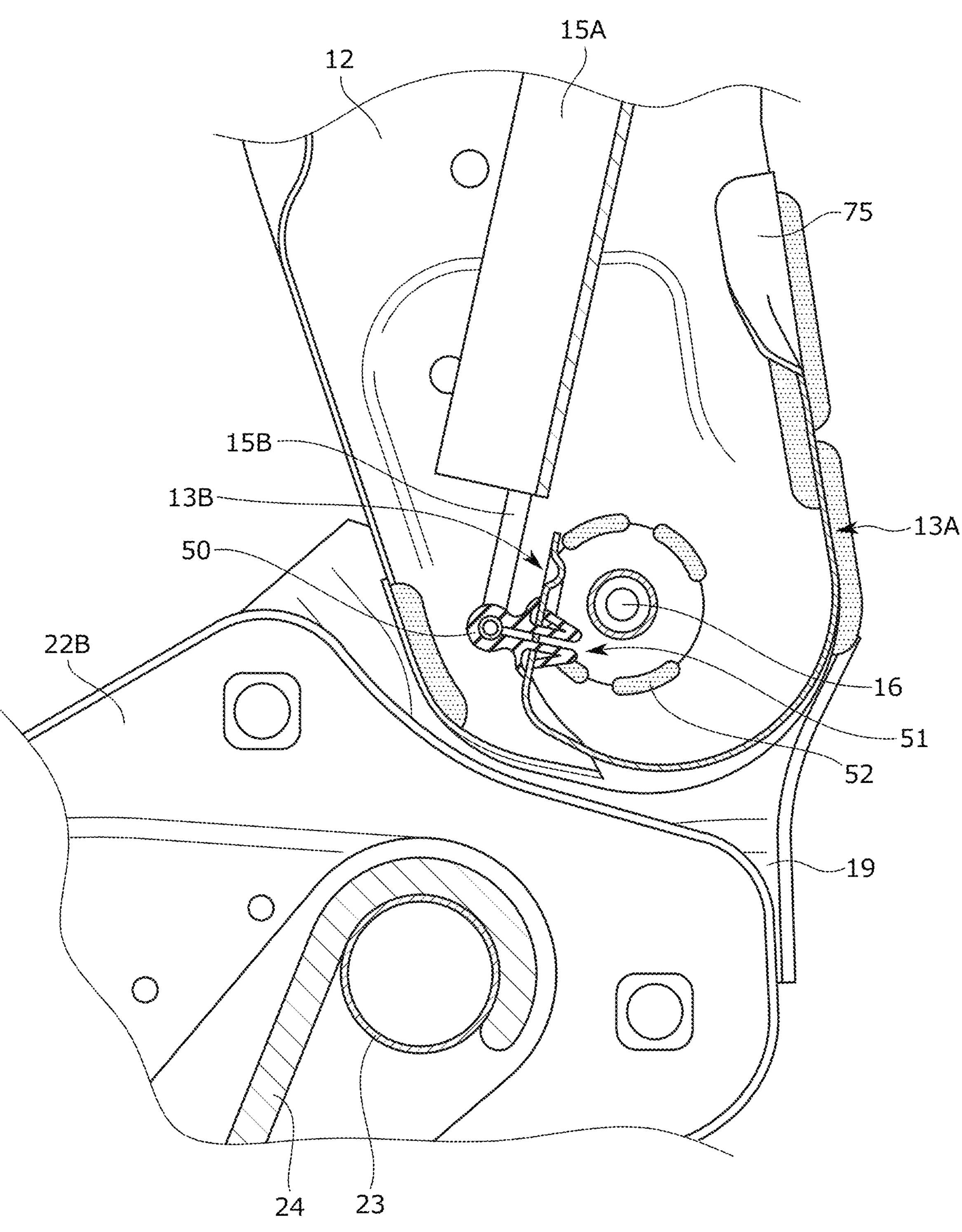
FIG. 9 is a sectional view along an IX-IX line of FIG. 7.
Figure 10:
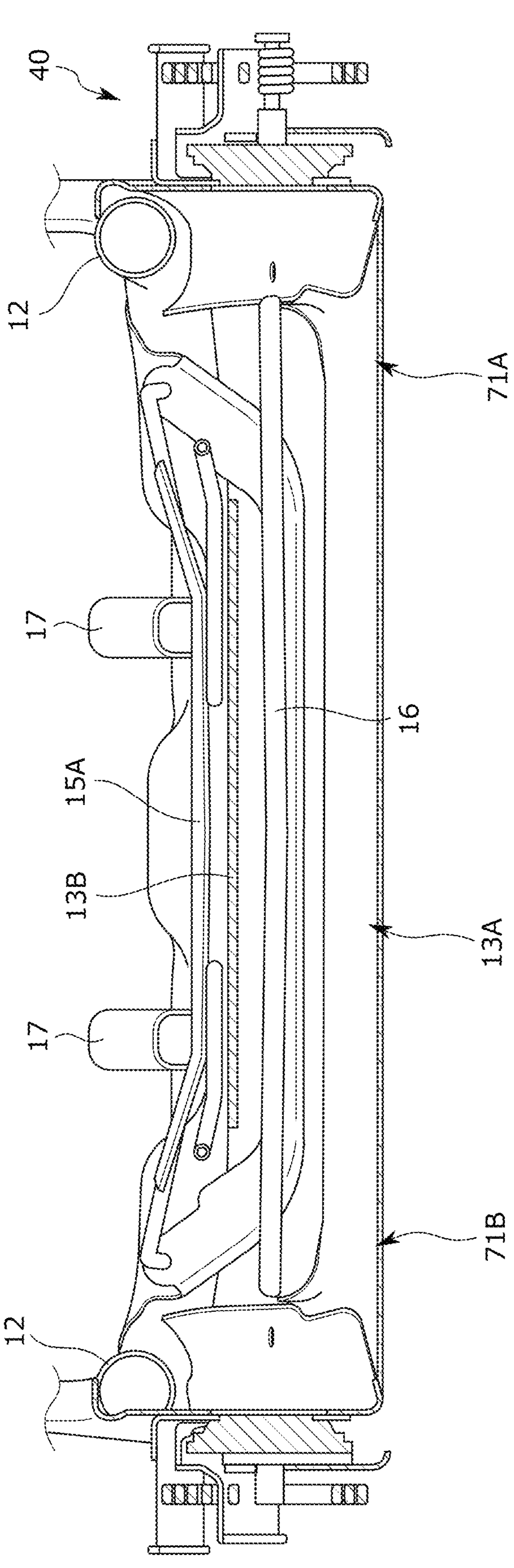
FIG. 10 is a sectional view along an X-X line of FIG. 7.
Figure 11:
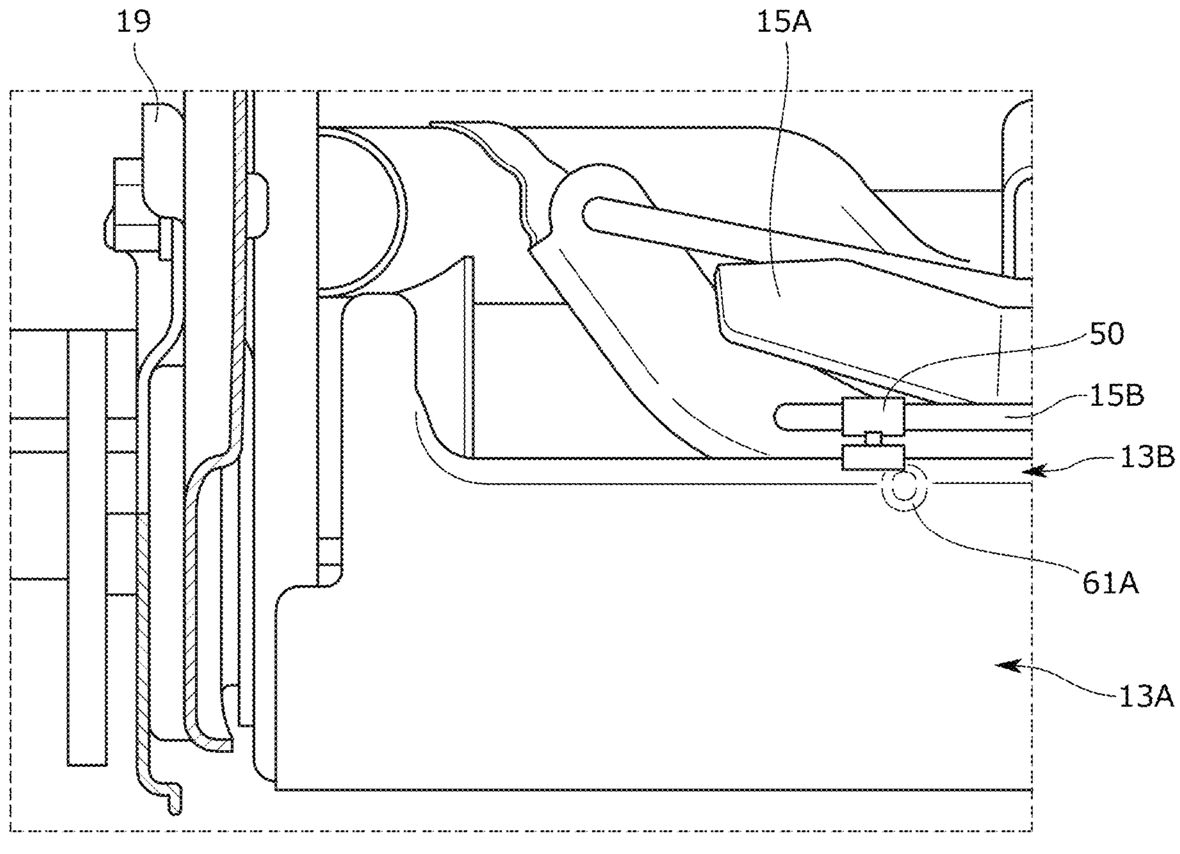
FIG. 11 is an enlarged partial view from a view point XI of FIG. 7.

Next, a configuration of the lower frame 13 is described with reference to FIGS. 7 to 11. FIG. 7 is a front view of the seat frame 1, and is an enlarged partial view of the periphery of the lower frame 13. FIG. 8 is a rear view of the seat frame 1, and is an enlarged partial view of the periphery of the lower frame 13. FIG. 9 is an IX-IX sectional view of FIG. 7, and FIG. 10 is an X-X sectional view of FIG. 7. FIG. 11 is a view from an arrow of a view point XI of FIG. 7, and is an enlarged partial view of the lower frame 13.

As illustrated in FIGS. 7 to 11, the lower frame 13 includes a rear wall portion 13A forming a seat rear portion and having a J-shaped section, and the front wall portion 13B formed continuously to a front end of the rear wall portion 13A and forming a seat front portion.

Configuration of Front Wall Portion 13B of Lower Frame 13

First, a configuration of the front wall portion 13B of the lower frame 13 is mainly described. As illustrated in FIGS. 7 and 9, the front wall portion 13B is a portion formed in such a manner that a seat width portion facing the support portion 15A is extended upward of the front end of the rear wall portion 13A. As illustrated in FIG. 7, the wire 15B attached, at a lower end thereof, to three clips 50 is attached to the support portion 15A. Moreover, attachment portions 51 as through-holes in which the clips 50 are to be fitted are formed at three spots at the front wall portion 13B. As illustrated in FIG. 7, the attachment portions 51 are provided apart from the support portion 15A below the support portion 15A. Moreover, the attachment portions 51 are provided inward of ends of the support portion 15A in the right-to-left direction. The clips 50 attached to the wire 15B are fitted in the attachment portions 51 of the front wall portion 13B, and in this manner, the wire 15B is fixed to the front wall portion 13B.

As illustrated in FIG. 7, an upper reinforcement portion 60A, an upper reinforcement portion 60B, and an upper reinforcement portion 60C extending in the seat width direction are formed above the attachment portion 51 of each clip 50 at the front wall portion 13B. As illustrated in FIG. 7, the upper reinforcement portion 60A, the upper reinforcement portion 60B, and the upper reinforcement portion 60C are formed on the substantially same horizontal plane. The upper reinforcement portion 60A is provided on the left side, the upper reinforcement portion 60B is provided at the center, and the upper reinforcement portion 60C is provided on the right side. Note that the upper reinforcement portion 60A, the upper reinforcement portion 60B, and the upper reinforcement portion 60C are formed as bead portions formed in such a manner that part of the front wall portion 13B is recessed backward of the seat by pressing.

As illustrated in FIG. 7, the upper reinforcement portion 60A, the upper reinforcement portion 60B, and the upper reinforcement portion 60C are formed in shapes along an upper edge of the front wall portion 13B. That is, the upper edge of the front wall portion 13B is in a linear shape at the center and in an arc shape at right and left end portions. Accordingly, a left end portion of the upper reinforcement portion 60A is formed in an arc shape, and other portions of the upper reinforcement portion 60A are formed in a linear shape. The upper reinforcement portion 60B is formed in a linear shape. A right end portion of the upper reinforcement portion 60C is formed in an arc shape, and other portions of the upper reinforcement portion 60C are formed in a linear shape. The position of the left end portion of the upper reinforcement portion 60A is on the outside of the opposing attachment portion 51 in the seat width direction. Similarly, the position of the right end portion of the upper reinforcement portion 60C is on the outside of the opposing attachment portion 51 in the seat width direction.

As illustrated in FIG. 7, a lower reinforcement portion 61A and a lower reinforcement portion 61B apart from each other are formed below the attachment portion 51 facing the upper reinforcement portion 60A at a boundary portion between the front wall portion 13B and the rear wall portion 13A. The lower reinforcement portion 61A and the lower reinforcement portion 61B are formed as bead portions formed in such a manner that the boundary portion between the front wall portion 13B and the rear wall portion 13A is recessed backward of the seat by pressing. As illustrated in FIG. 7, the attachment portion 51 facing the upper reinforcement portion 60A is, in the seat upper-to-lower direction, provided between the upper reinforcement portion 60A and each of the lower reinforcement portion 61A and the lower reinforcement portion 61B. The position of the left end portion of the upper reinforcement portion 60A is on the outside of the lower reinforcement portion 61A in the seat width direction. Moreover, the position of a right end portion of the upper reinforcement portion 60A is on the outside of the lower reinforcement portion 61B in the seat width direction. That is, the lower reinforcement portion 61A and the lower reinforcement portion 61B are, in the seat width direction, formed inward of the upper reinforcement portion 60A provided above the lower reinforcement portion 61A and the lower reinforcement portion 61B. Moreover, a spacing between the lower reinforcement portion 61A and the lower reinforcement portion 61B is shorter than the length of the upper reinforcement portion 60A in the width direction.

As illustrated in FIG. 7, a lower reinforcement portion 61C and a lower reinforcement portion 61D apart from each other are formed below the attachment portion 51 facing the upper reinforcement portion 60B at the boundary portion between the front wall portion 13B and the rear wall portion 13A. The lower reinforcement portion 61C and the lower reinforcement portion 61D are formed as bead portions formed in such a manner that the boundary portion between the front wall portion 13B and the rear wall portion 13A is recessed backward of the seat by pressing. As illustrated in FIG. 7, the attachment portion 51 facing the upper reinforcement portion 60B is, in the seat upper-to-lower direction, provided between the upper reinforcement portion 60B and each of the lower reinforcement portion 61C and the lower reinforcement portion 61D. Moreover, the attachment portion 51 facing the upper reinforcement portion 60B is, in the seat width direction, provided between the lower reinforcement portion 61C and the lower reinforcement portion 61D. The position of a left end portion of the upper reinforcement portion 60B is on the outside of the lower reinforcement portion 61C in the seat width direction. Moreover, the position of a right end portion of the upper reinforcement portion 60B is on the outside of the lower reinforcement portion 61D in the seat width direction. That is, the lower reinforcement portion 61C and the lower reinforcement portion 61D are, in the seat width direction, formed inside the upper reinforcement portion 60B provided above the lower reinforcement portion 61C and the lower reinforcement portion 61D. Moreover, a spacing between the lower reinforcement portion 61C and the lower reinforcement portion 61D is shorter than the length of the upper reinforcement portion 60B in the width direction.

As illustrated in FIG. 7, a lower reinforcement portion 61E and a lower reinforcement portion 61F apart from each other are formed below the attachment portion 51 facing the upper reinforcement portion 60C at the boundary portion between the front wall portion 13B and the rear wall portion 13A. The lower reinforcement portion 61E and the lower reinforcement portion 61F are formed as bead portions formed in such a manner that the boundary portion between the front wall portion 13B and the rear wall portion 13A is recessed backward of the seat by pressing. As illustrated in FIG. 7, the attachment portion 51 facing the upper reinforcement portion 60C is, in the seat upper-to-lower direction, provided between the upper reinforcement portion 60C and each of the lower reinforcement portion 61E and the lower reinforcement portion 61F. The position of a left end portion of the upper reinforcement portion 60C is on the outside of the lower reinforcement portion 61E in the seat width direction. Moreover, the position of the right end portion of the upper reinforcement portion 60C is on the outside of the lower reinforcement portion 61F in the seat width direction. That is, the lower reinforcement portion 61E and the lower reinforcement portion 61F are, in the seat width direction, formed inside the upper reinforcement portion 60C provided above the lower reinforcement portion 61E and the lower reinforcement portion 61F. Moreover, a spacing between the lower reinforcement portion 61E and the lower reinforcement portion 61F is shorter than the length of the upper reinforcement portion 60C in the width direction.

As illustrated in FIG. 7, a spacing between the upper reinforcement portion 60A and the upper reinforcement portion 60B adjacent to each other on the upper side is shorter than a spacing between the lower reinforcement portion 61B and the lower reinforcement portion 61C adjacent to each other on the lower side. Similarly, a spacing between the upper reinforcement portion 60B and the upper reinforcement portion 60C adjacent to each other on the upper side is shorter than a spacing between the lower reinforcement portion 61D and the lower reinforcement portion 61E adjacent to each other on the lower side.

For example, in the case of attaching the pressure receiving member 15 to a front surface of the rear wall portion 13A, the process of attaching the pressure receiving member 15 is not easy because the rotary shaft 16 is provided between the rear wall portion 13A and the front wall portion 13B and there is not sufficient space. Meanwhile, at the seat frame 1, the attachment portions 51 for attaching the wire 15B of the pressure receiving member 15 are provided at the front wall portion 13B of the lower frame 13, and therefore, the rotary shaft 16 and an engineer's hand (not shown) do not contact each other. Thus, workability in attachment of the pressure receiving member 15 can be improved.

Configuration of Rear Wall Portion 13A of Lower Frame 13

Next, a configuration of the rear wall portion 13A of the lower frame 13 is mainly described. As illustrated in FIG. 9, an upper end of the rear wall portion 13A is positioned above an upper end of the front wall portion 13B. Moreover, a lower end of the support portion 15A is positioned above the upper end of the front wall portion 13B and below the upper end of the rear wall portion 13A. Moreover, as illustrated in FIG. 9, the front wall portion 13B is provided substantially parallel to the support portion 15A. Note that the support portion 15A is substantially parallel to the torso line T, and in other words, the front wall portion 13B is provided substantially parallel to the torso line T.

As illustrated in FIG. 8, upwardly-protruding portions 75 protruding upward are each provided at both upper outer portions of the rear wall portion 13A in the seat width direction. The upwardly-protruding portion 75 is formed in a shape along the side frame 12, and a reinforcement portion 74 is formed at a position facing the rear reinforcement portion 30D of the side frame 12. Note that the reinforcement portion 74 is formed as a bead portion recessed forward of the seat, and is in a shape engageable with the rear reinforcement portion 30D. Note that both side portions of the rear wall portion 13A in the seat width direction are joined to the side frames 12 by welding.

According to the seat frame 1 of the present embodiment as described above, the first reinforcement portion 30A, the second reinforcement portion 30B, and the third reinforcement portion 30C are provided at the side frame side portion 12A of the side frame 12, and therefore, the stiffness of the side frame 12 can be improved. The first reinforcement portion 30A, the second reinforcement portion 30B, and the third reinforcement portion 30C described herein are different from each other in an extension direction, and therefore, the stiffness against load input from various directions can be improved.

Moreover, according to the seat frame 1, the attachment portions 51 of the pressure receiving member 15 are provided at the front wall portion 13B of the lower frame 13, and therefore, the workability in attachment of the pressure receiving member 15 can be improved. Moreover, the reinforcement portions are provided on the upper and lower sides of the attachment portions 51 at the front wall portion 13B, and therefore, the stiffness of the periphery of the attachment portions 51 can be improved.

Variations

The present disclosure is not limited to the above-described embodiment. Hereinafter, variations of the reinforcement portions (bead shapes) formed at the side frame side portion 12A of the side frame 12 are described with reference to FIGS. 12A to 12D. FIGS. 12A to 12D each illustrate outer side views of the side frames 12 according to the variations.

Figure 12A:
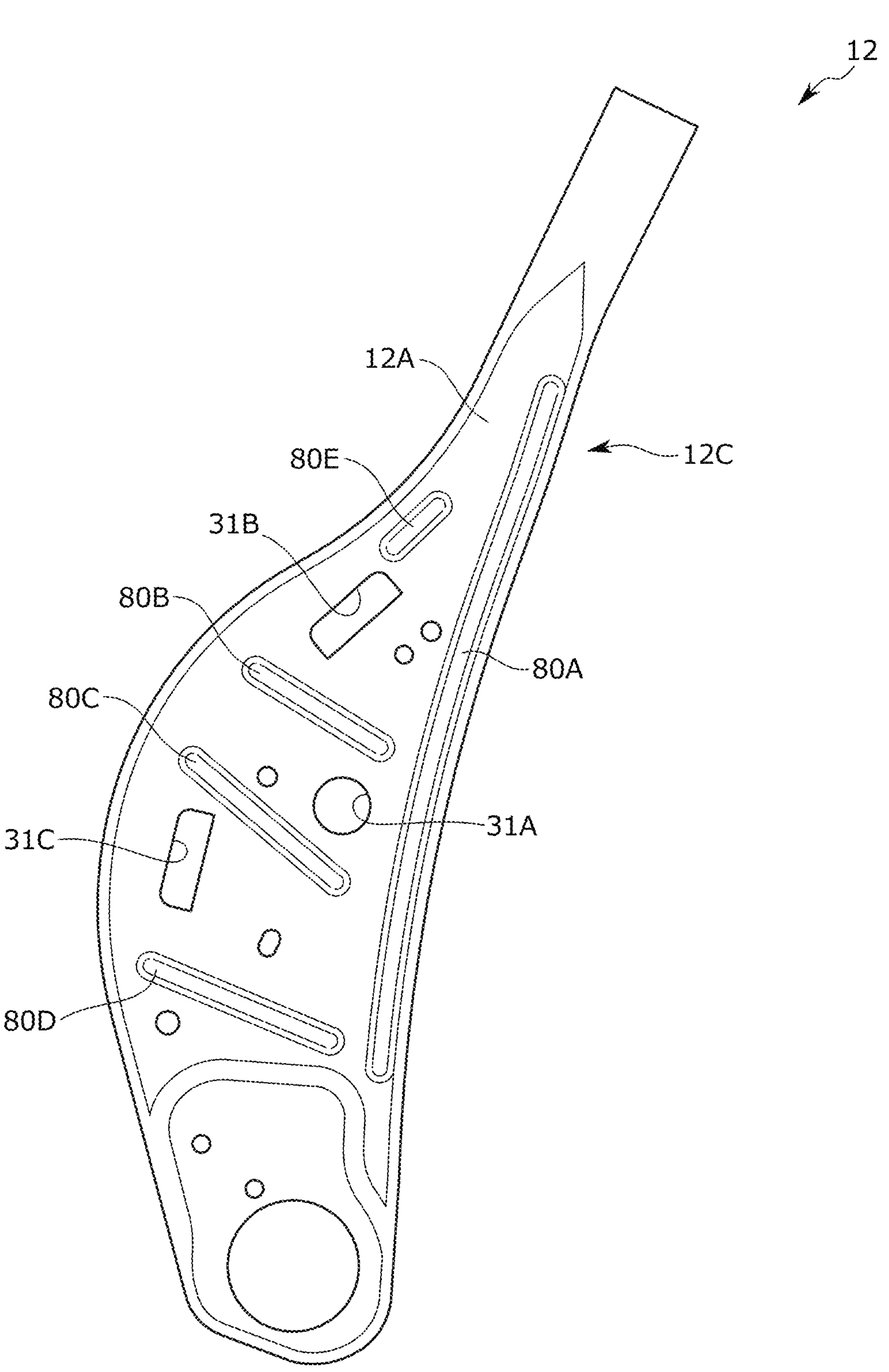
FIG. 12A is a view of a variation of reinforcement portions provided at the side frame.

First, the side frame 12 according to a first variation is described. As illustrated in FIG. 12A, the side frame 12 according to the first variation includes a reinforcement portion 80A, a reinforcement portion 80B, a reinforcement portion 80C, a reinforcement portion 80D, and a reinforcement portion 80E. Each of the reinforcement portion 80A, the reinforcement portion 80B, the reinforcement portion 80C, the reinforcement portion 80D, and the reinforcement portion 80E described herein is formed as a bead portion formed in such a manner that the side frame side portion 12A is recessed inward of the seat by pressing. The reinforcement portion 80A is provided along the rear edge 12C of the side frame side portion 12A. The reinforcement portion 80B is provided to extend in the seat front-to-rear direction between the airbag attachment hole 31A and the airbag attachment hole 31B. The reinforcement portion 80C is provided to extend in the seat front-to-rear direction between the airbag attachment hole 31A and the airbag attachment hole 31C. The reinforcement portion 80D is provided to extend in the seat front-to-rear direction below the airbag attachment hole 31C. The reinforcement portion 80E is provided along the front edge of the side frame side portion 12A above the airbag attachment hole 31B.

As illustrated in FIG. 12A, any of the reinforcement portion 80A, the reinforcement portion 80B, the reinforcement portion 80C, the reinforcement portion 80D, and the reinforcement portion 80E is not necessarily coupled to other reinforcement portions, and may be provided as independent bead portions. Moreover, the reinforcement portion 80A, the reinforcement portion 80B, the reinforcement portion 80C, the reinforcement portion 80D, and the reinforcement portion 80E may be different from each other in their respective extension directions.

Figure 12B:
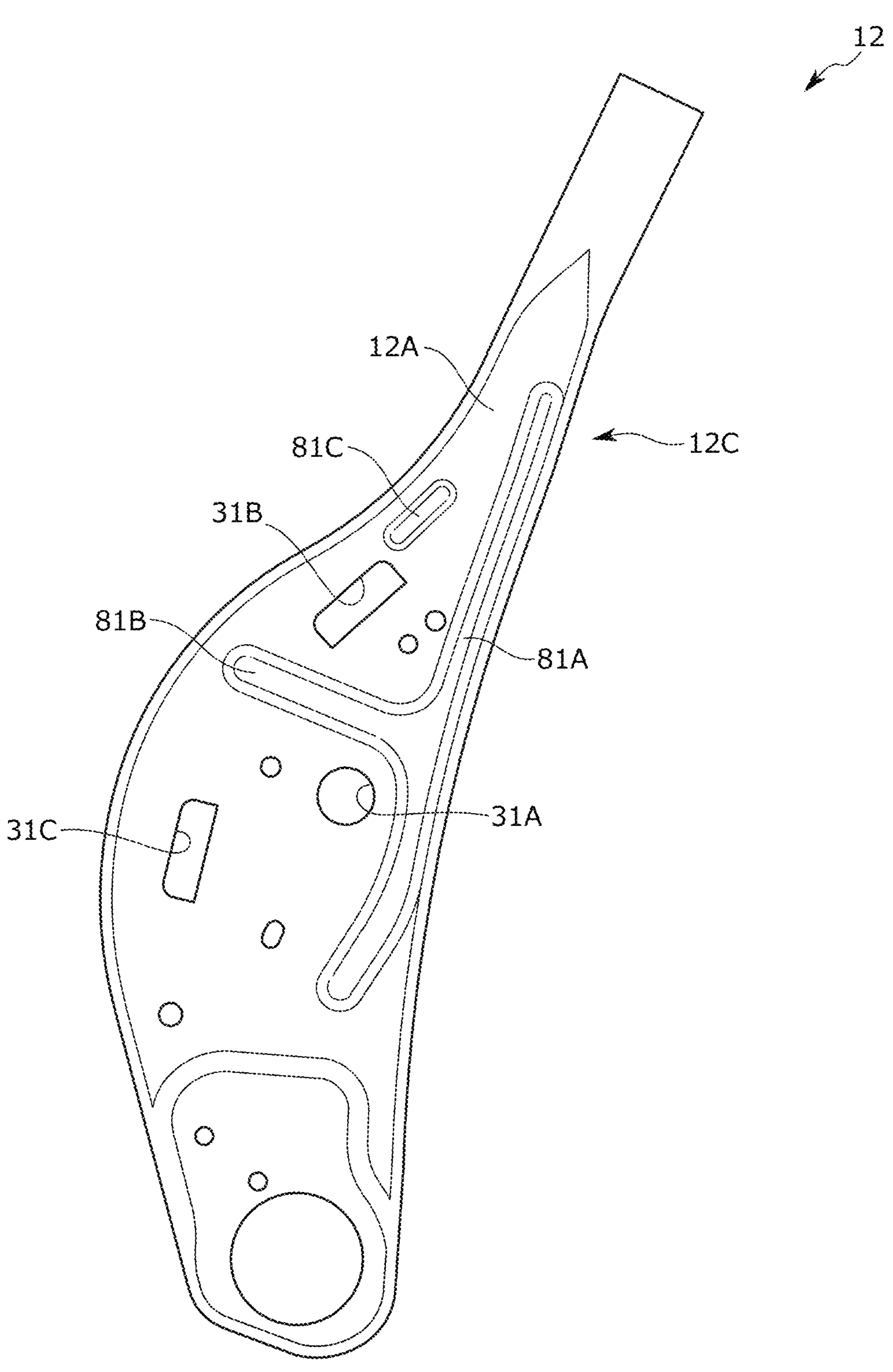
FIG. 12B is a view of another variation of the reinforcement portions provided at the side frame.

Next, the side frame 12 according to a second variation is described. As illustrated in FIG. 12B, the side frame 12 according to the second variation includes a reinforcement portion 81A, a reinforcement portion 81B, and a reinforcement portion 81C. Each of the reinforcement portion 81A, the reinforcement portion 81B, and the reinforcement portion 81C described herein is formed as a bead portion formed in such a manner that the side frame side portion 12A is recessed inward of the seat by pressing. The reinforcement portion 81A is provided along the rear edge 12C of the side frame side portion 12A. Note that a lower end of the reinforcement portion 81A is curved inward of the seat. The reinforcement portion 81B is provided to extend in the seat front-to-rear direction between the airbag attachment hole 31A and the airbag attachment hole 31B. Moreover, a rear end of the reinforcement portion 81B is coupled to the reinforcement portion 81A. The reinforcement portion 81C is provided along the front edge of the side frame side portion 12A above the airbag attachment hole 31B.

Figure 12C:
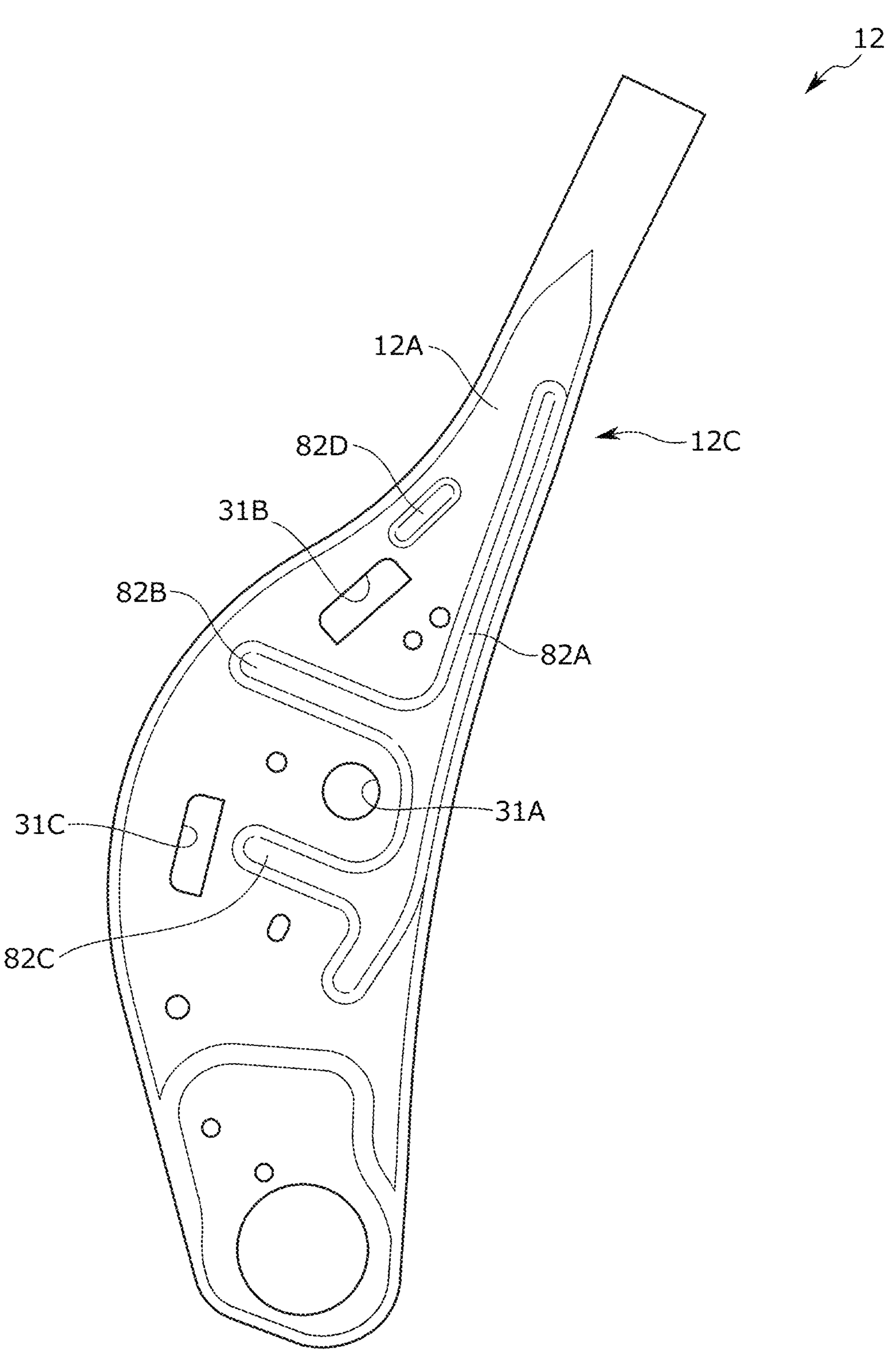
FIG. 12C is a view of still another variation of the reinforcement portions provided at the side frame.

Next, the side frame 12 according to a third variation is described. As illustrated in FIG. 12C, the side frame 12 according to the third variation includes a reinforcement portion 82A, a reinforcement portion 82B, a reinforcement portion 82C, and a reinforcement portion 82D. Each of the reinforcement portion 82A, the reinforcement portion 82B, the reinforcement portion 82C, and the reinforcement portion 82D described herein is formed as a bead portion formed in such a manner that the side frame side portion 12A is recessed inward of the seat by pressing. The reinforcement portion 82A is provided along the rear edge 12C of the side frame side portion 12A. Note that a lower end of the reinforcement portion 82A is bent inward of the seat. The reinforcement portion 82B is provided to extend in the seat front-to-rear direction between the airbag attachment hole 31A and the airbag attachment hole 31B. Moreover, a rear end of the reinforcement portion 82B is coupled to the reinforcement portion 82A. The reinforcement portion 82C is provided to extend in the seat front-to-rear direction from a bent portion of the reinforcement portion 82A to the airbag attachment hole 31C. Moreover, a rear end of the reinforcement portion 82C is coupled to the reinforcement portion 82A. The reinforcement portion 82D is provided along the front edge of the side frame side portion 12A above the airbag attachment hole 31B.

Figure 12D:
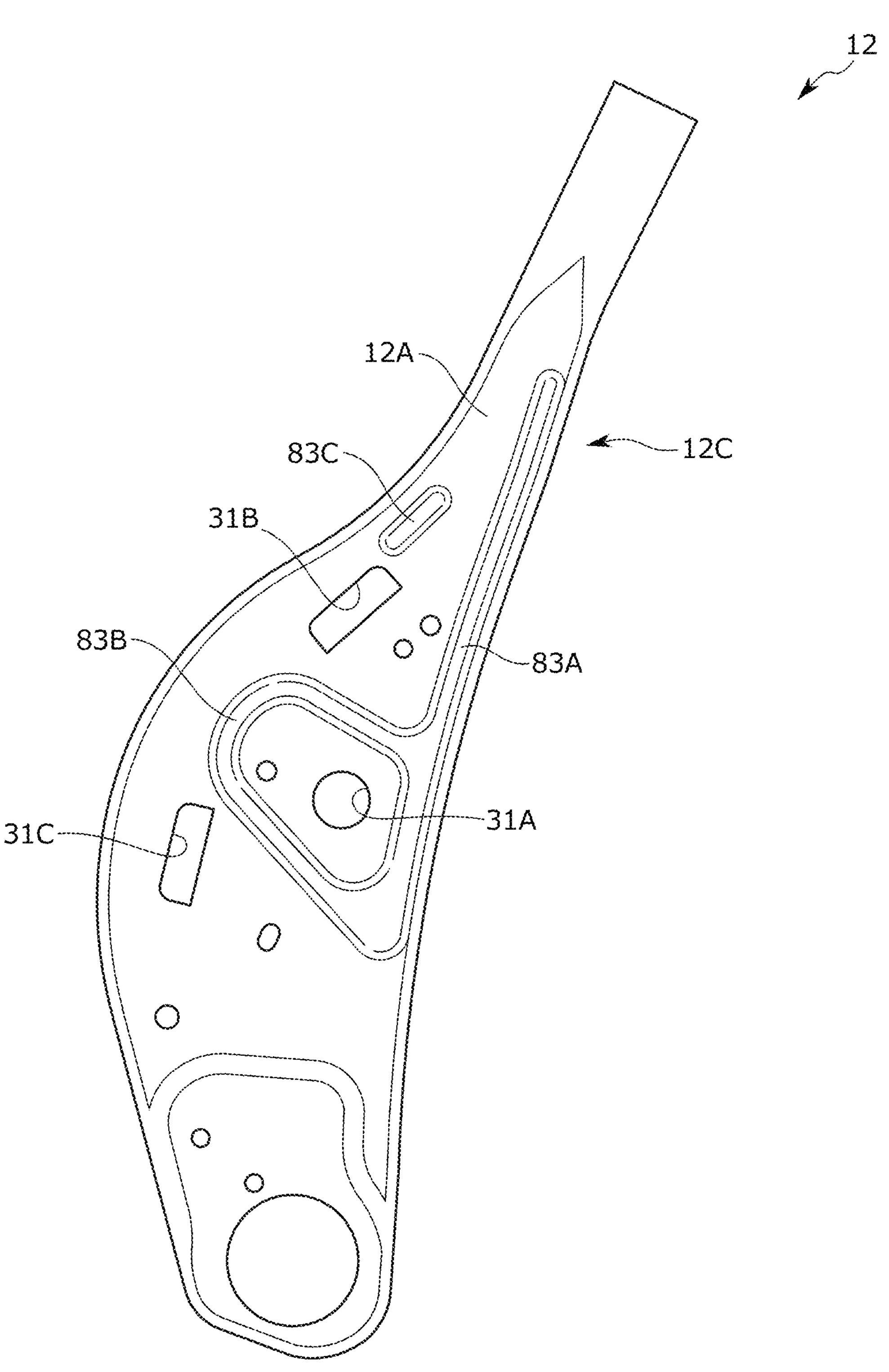
FIG. 12D is a view of still another variation of the reinforcement portions provided at the side frame.

Next, the side frame 12 according to a fourth variation is described. As illustrated in FIG. 12D, the side frame 12 according to the fourth variation includes a reinforcement portion 83A, a reinforcement portion 83B, and a reinforcement portion 83C. Each of the reinforcement portion 83A, the reinforcement portion 83B, and the reinforcement portion 83C described herein is formed as a bead portion formed in such a manner that the side frame side portion 12A is recessed inward of the seat by pressing. The reinforcement portion 83A is provided along the rear edge 12C of the side frame side portion 12A. The reinforcement portion 83B is formed in an annular ring shape, and at a rear end portion thereof, is coupled to the reinforcement portion 83A. Moreover, the reinforcement portion 83B is formed among the airbag attachment hole 31A, the airbag attachment hole 31B, and the airbag attachment hole 31C, and includes the airbag attachment hole 31A. The reinforcement portion 83C is provided along the front edge of the side frame side portion 12A above the airbag attachment hole 31B.

Second Embodiment

Next, a seat frame 1 according to a second embodiment is described with reference to FIGS. 13 to 18. In the seat frame 1 according to the second embodiment, a cross member 100 bridged at an upper frame 11 is different from the cross member 14 illustrated in FIG. 1 as described below, but other points are common to the first and second embodiments. Thus, a configuration of the cross member 100 is described below.

Figure 13:
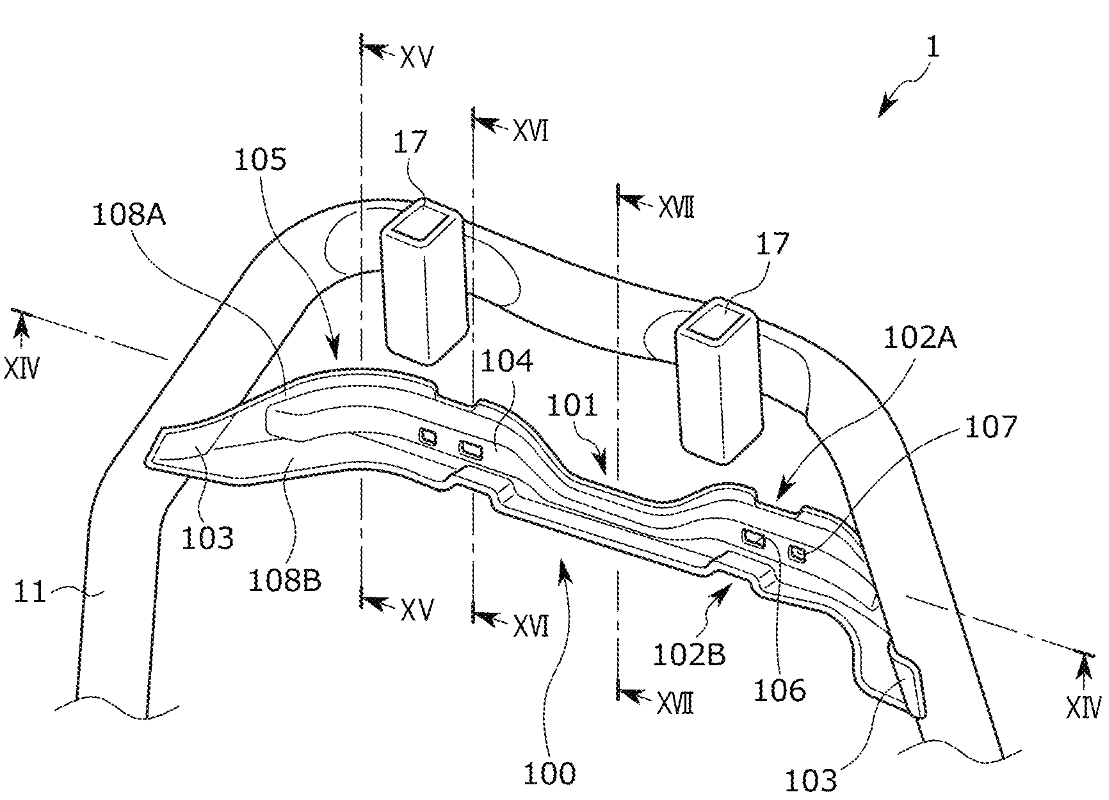
FIG. 13 is a view of an upper portion of a seat frame according to a second embodiment.

As illustrated in FIG. 13, the cross member 100 extending in the seat width direction is bridged between right and left bent portions of the upper frame 11. Right and left end portions 103 of the cross member 100 are welded and fixed to the right and left bent portions of the upper frame 11.

At an upper end of the cross member 100, a first recessed portion 101 recessed downward is formed between the right and left end portions 103. Note that in the case of providing the first recessed portion 101 at a lower end of the cross member 100, the first recessed portion 101 is in a shape recessed upward between the right and left end portions 103.

Figure 14:
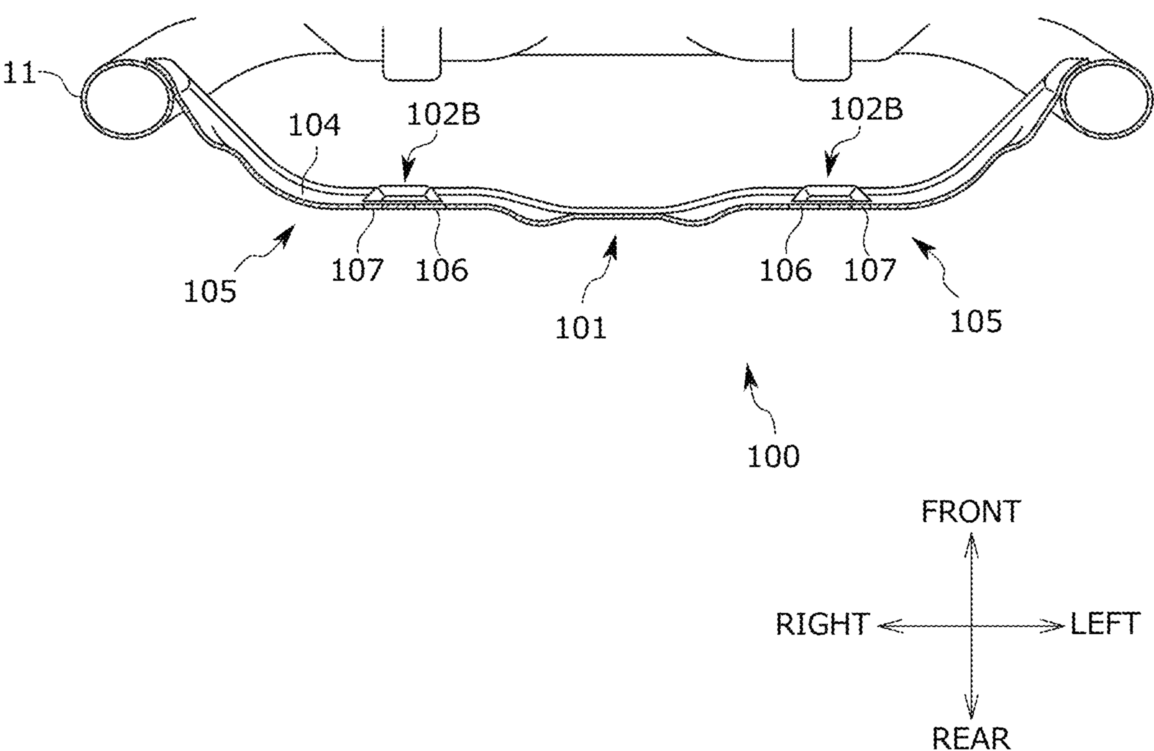
FIG. 14 is a sectional view along an XIV-XIV line of FIG. 13.
Figure 15:
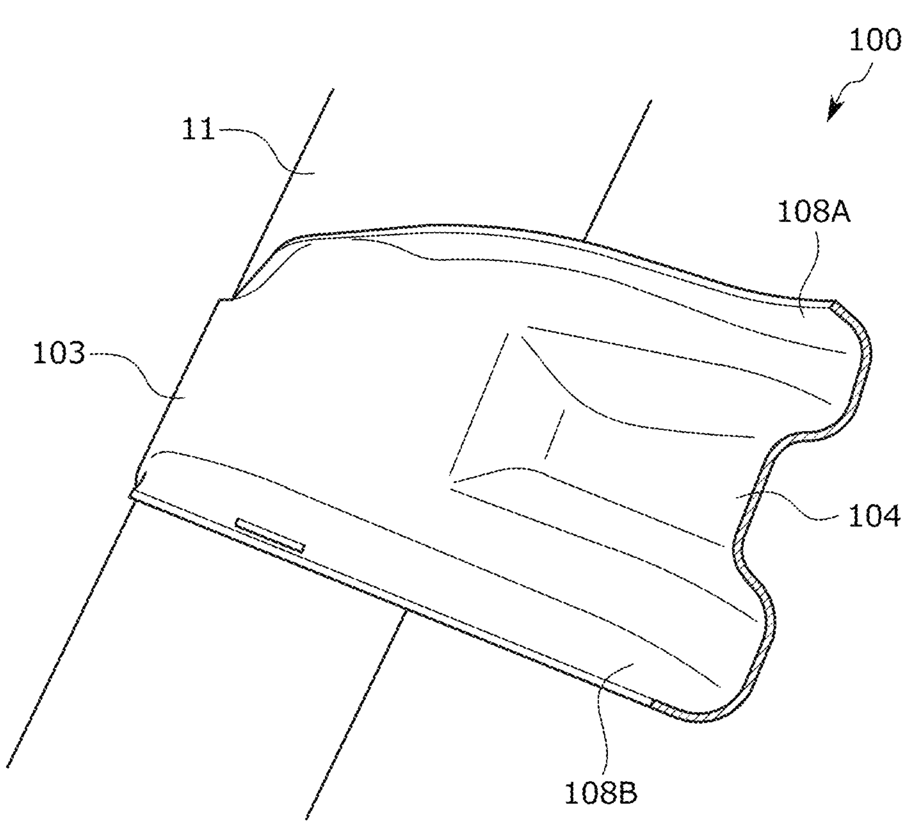
FIG. 15 is a sectional view along an XV-XV line of FIG. 13.
Figure 15:
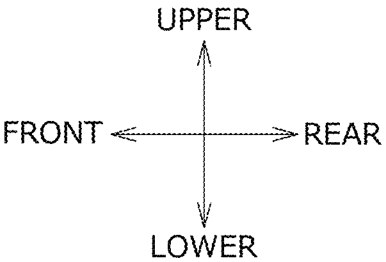
Figure 16:
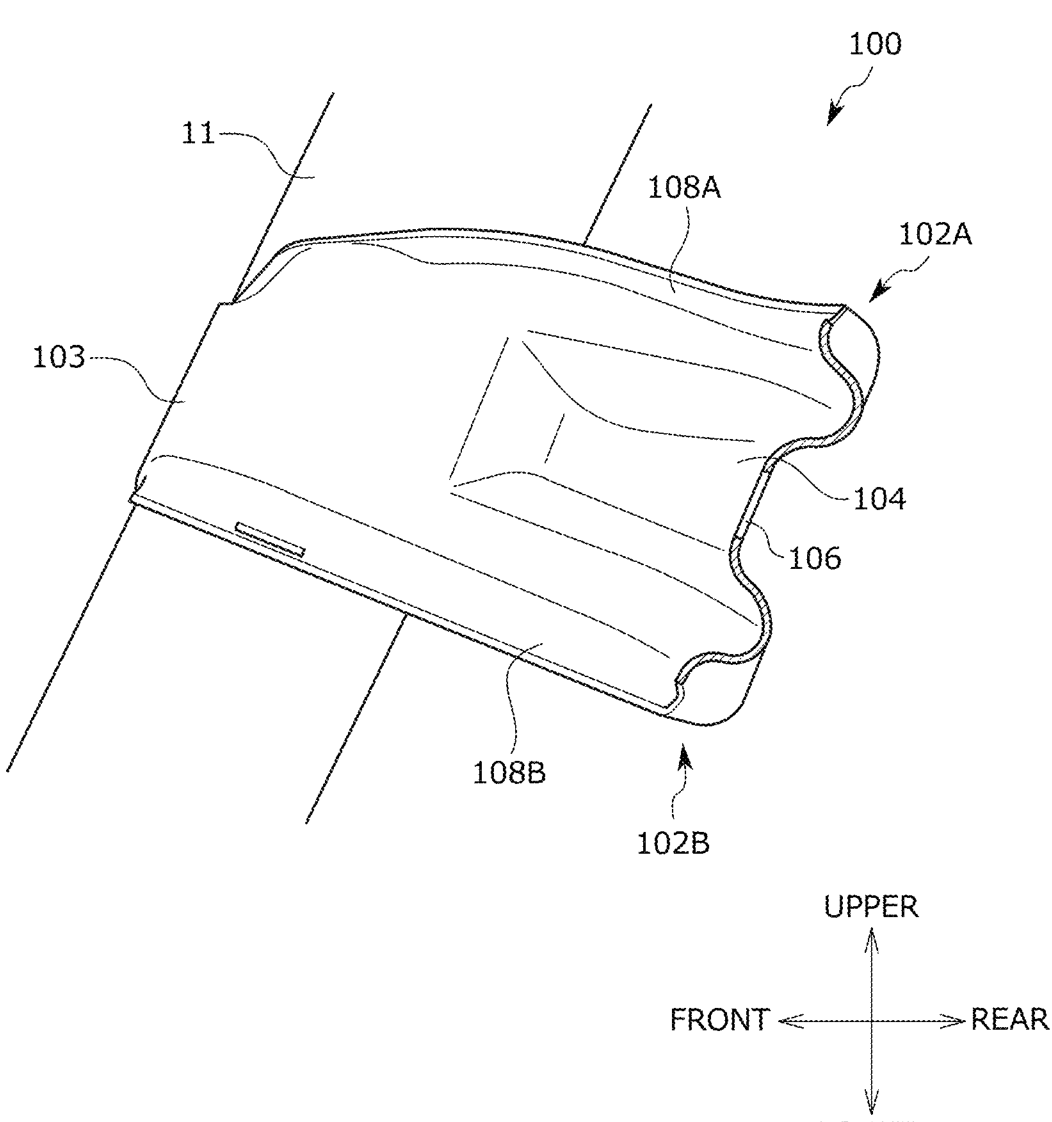
FIG. 16 is a sectional view along an XVI-XVI line of FIG. 13.
Figure 17:
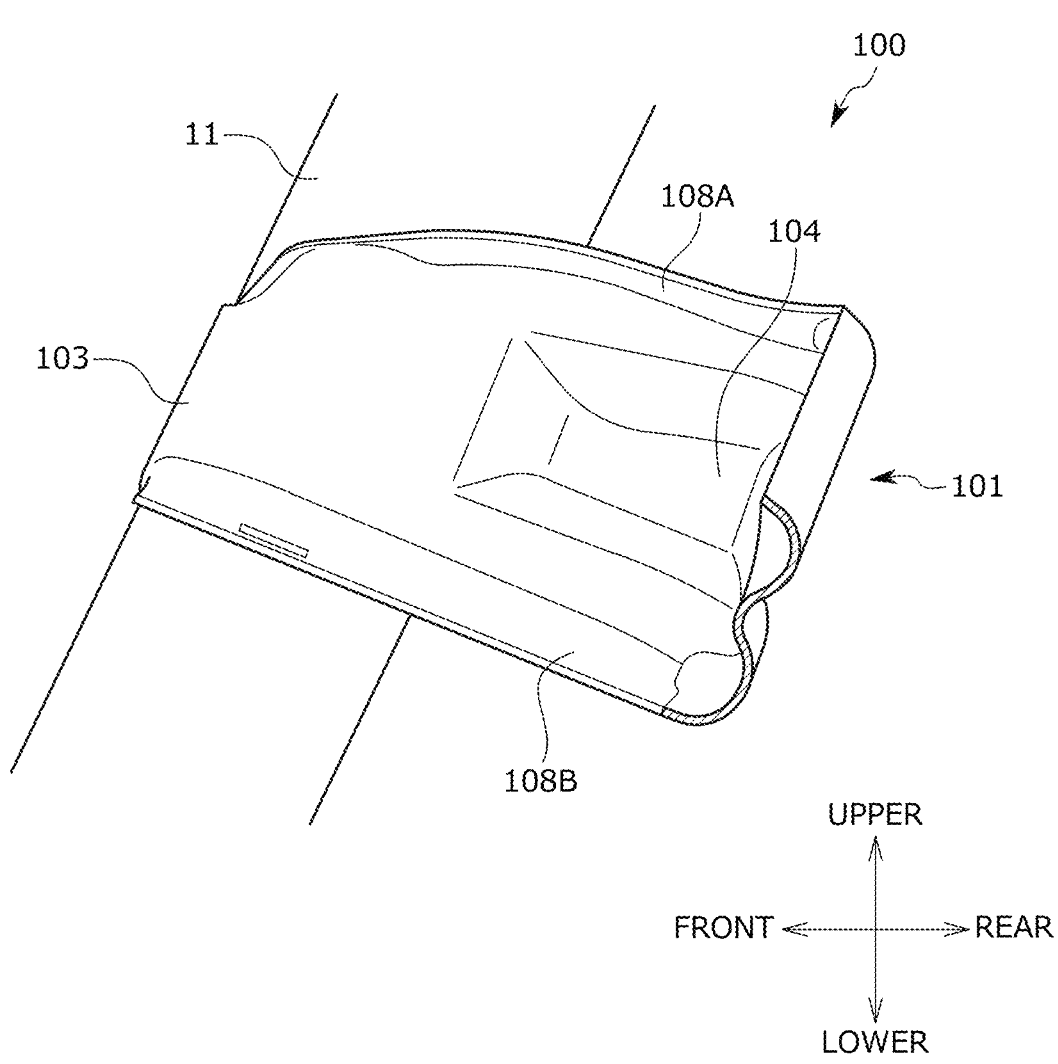
FIG. 17 is a sectional view along an XVII-XVII line of FIG. 13.

As illustrated in FIGS. 13 and 14, the first recessed portion 101 is provided at a center portion of the cross member 100 in the seat width direction. Note that the center portion of the cross member 100 in the seat width direction is between right and left headrest attachment portions 17.

The cross member 100 has wide portions 105 on the right and left sides of the first recessed portion 101 in the seat width direction. The wide portion 105 is configured such that the width thereof in the upper-to-lower direction is greater than that of the first recessed portion 101. Note that the cross member 100 is in a symmetrical shape with respect to the first recessed portion 101 in the right-to-left direction. That is, the shapes of the right and left wide portions 105 are symmetrical in the right-to-left direction.

As illustrated in FIG. 14, the wide portion 105 is curved to protrude backward of the seat. Specifically, an outer portion of the wide portion 105 in the seat width direction is curved in a shape protruding backward of the seat.

As illustrated in FIGS. 13 to 17, a reinforcement portion 104 is formed at a center portion of the cross member 100 in the upper-to-lower direction. The reinforcement portion 104 is formed across the first recessed portion 101 and the right and left wide portions 105. The reinforcement portion 104 protrudes forward of the seat. Specifically, the reinforcement portion 104 is configured as a bead portion formed in such a manner that part of the cross member 100 is projected forward of the seat by pressing, for example. Thus, the stiffness of the cross member 100 is improved. Note that as illustrated in FIG. 13, the reinforcement portion 104 of the wide portion 105 is wider in the upper-to-lower direction than the reinforcement portion 104 of the first recessed portion 101.

As illustrated in FIG. 13, a first through-hole 106 and a second through-hole 107 are formed at the reinforcement portion 104 at the wide portion 105. The first through-hole 106 is a rectangular through-hole, and the second through-hole 107 is a circular through-hole. As described above, the shapes of the through-holes formed at the reinforcement portion 104 of the wide portion 105 are not specifically limited. Note that the through-holes such as the first through-hole 106 and the second through-hole 107 are formed at the cross member 100, and therefore, the weight of the cross member 100 can be reduced.

As illustrated in FIGS. 13 to 17, a first flange portion 108A is formed at an upper end portion of the cross member 100. The first flange portion 108A is a portion formed in such a manner that the upper end portion of the cross member 100 is bent forward of the seat. Moreover, the first flange portion 108A is formed across the first recessed portion 101 and the right and left wide portions 105. The first flange portion 108A is formed at a position facing the first recessed portion 101 in the upper-to-lower direction. That is, the first flange portion 108A is formed above the first recessed portion 101.

A second recessed portion 102A recessed downward of the seat is formed at the first flange portion 108A of the wide portion 105. In other words, the second recessed portion 102A is a recessed portion provided at the upper end of the cross member 100 and formed differently from the first recessed portion 101. A portion below the second recessed portion 102A protrudes forward of the seat.

As illustrated in FIGS. 13 to 17, a second flange portion 108B is formed at a lower end portion of the cross member 100. The second flange portion 108B is a portion formed in such a manner that the lower end portion of the cross member 100 is bent forward of the seat. Moreover, the second flange portion 108B is formed across the first recessed portion 101 and the right and left wide portions 105.

A second recessed portion 102B recessed upward of the seat is formed at the second flange portion 108B of the wide portion 105. In other words, the second recessed portion 102B is a recessed portion provided at the lower end of the cross member 100 and formed differently from the first recessed portion 101. A portion above the second recessed portion 102B protrudes forward of the seat.

The second recessed portion 102A, the first through-hole 106, and the second recessed portion 102B are arranged at positions overlapping with each other in the upper-to-lower direction.

Note that the above-described cross member 100 has both of the first flange portion 108A and the second flange portion 108B, but may have either one of the first flange portion 108A or the second flange portion 108B.

Figure 18:
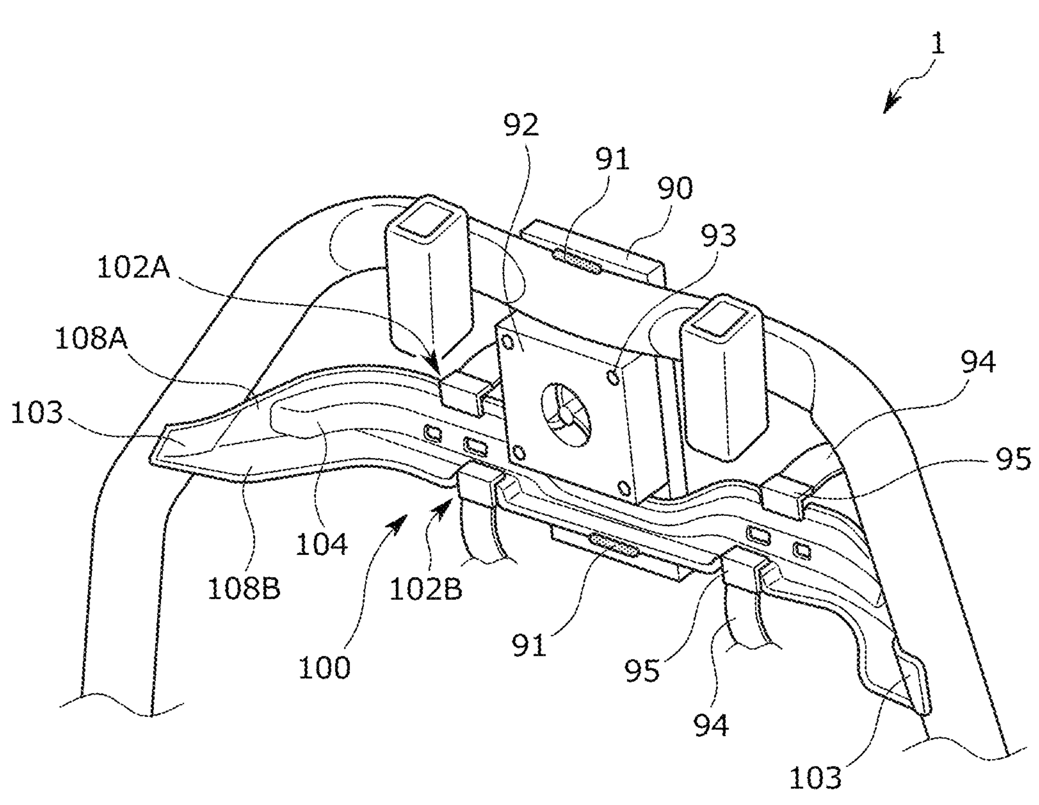
FIG. 18 is a view for describing a state in which a blower and stop members are attached to a seat back frame according to the second embodiment.

An example of attachment of a member to the cross member 100 of the seat frame 1 according to the second embodiment is described with reference to FIG. 18. As illustrated in FIG. 18, a blower 92 is attached to above the first recessed portion 101 of the cross member 100. Specifically, an attachment member 90 is fixed between the upper frame 11 and the first recessed portion 101 of the cross member 100. For example, the attachment member 90 is a metal plate-shaped plate. The attachment member 90 is welded to the upper frame 11 and the first recessed portion 101 of the cross member 100 at welding portions 91.

Using fasteners 93 such as screws, the blower 92 is fixed to the attachment member 90. Thus, the blower 92 can be arranged in a space above the first recessed portion 101 of the cross member 100. As described above, the first recessed portion 101 is in a shape recessed downward, and therefore, a greater space than the wide portion 105 is formed above the first recessed portion 101 of the cross member 100. Thus, a relatively-large member such as the blower 92 can be arranged above the first recessed portion 101.

Stop portions 95 of cover portions 94 can be attached to the second recessed portion 102A and the second recessed portion 102B of the cross member 100. For example, in a case where the stop portion 95 is a hook, the hook is stopped at a protruding portion of the second recessed portion 102A (or the second recessed portion 102B), and in this manner, the stop portion 95 can be attached to the second recessed portion 102A (or the second recessed portion 102B). As described above, various members can be attached to the cross member 100.

Advantageous Effects of Seat Frame 1

The seat frame 1 includes the side frames 12 arranged on the right and left sides, and has the first reinforcement portion 30A extending in the upper-to-lower direction along the rear edge of the side frame side portion 12A positioned outside in the seat width direction at the side frame 12. According to the seat frame 1, the rear edge of the side frame side portion 12A is reinforced so that the stiffness of the side frame 12 can be improved.

Moreover, in the seat frame 1, the first reinforcement portion 30A is provided at least at the wide portion having the greatest width in the seat front-to-rear direction at the side frame side portion 12A. With this configuration, the wide portion of the side frame side portion 12A is reinforced so that the stiffness of the side frame 12 can be improved.

Further, the seat frame 1 has the second reinforcement portion 30B provided at the side frame side portion 12A and extending in the seat front-to-rear direction, and the second reinforcement portion 30B is provided within an upper-to-lower area where the first reinforcement portion 30A extends. With this configuration, the side frame side portion 12A is reinforced in the upper-to-lower direction and the front-to-rear direction, and therefore, the stiffness of the side frame 12 can be improved.

In addition, in the seat frame 1, the first reinforcement portion 30A and the second reinforcement portion 30B are coupled to each other. With this configuration, the first reinforcement portion 30A and the second reinforcement portion 30B can be integrally formed. Thus, formation of the reinforcement portions is facilitated.

Moreover, the seat frame 1 has the third reinforcement portion 30C provided at the side frame side portion 12A and extending in the front-to-rear direction at a position apart in a downward direction from the second reinforcement portion 30B. With this configuration, the stiffness of the side frame side portion 12A can be improved across a broad area.

Further, in the seat frame 1, the second reinforcement portion 30B is coupled to the portion between the upper and lower ends of the first reinforcement portion 30A, and the third reinforcement portion 30C is coupled to the lower end of the first reinforcement portion 30A. With this configuration, the stiffness of the side frame side portion 12A can be improved in a balanced manner.

In addition, in the seat frame 1, the second reinforcement portion 30B and the third reinforcement portion 30C are different from each other in the angle of extension with respect to the first reinforcement portion 30A. With this configuration, the stiffness against load input from various directions can be improved.

Moreover, in the seat frame 1, the second reinforcement portion 30B extends in the direction substantially perpendicular to the torso line T. With this configuration, stiffness on a high load input side can be improved.

Further, in the seat frame 1, the second reinforcement portion 30B extends between the multiple through-holes formed at the side frame side portion 12A. With this configuration, the stiffness of the periphery of the through-holes can be improved.

In addition, in the seat frame 1, the multiple through-holes include the airbag attachment hole 31A for attaching the airbag, and the second reinforcement portion 30B and the third reinforcement portion 30C are provided at the positions sandwiching the airbag attachment hole 31A in the upper-to-lower direction. With this configuration, the stiffness of a portion of the side frame 12 attached to the airbag can be improved.

Moreover, in the seat frame 1, the first reinforcement portion 30A is at the position facing at least one of the multiple through-holes in the upper-to-lower direction. With this configuration, the stiffness of the periphery of the through-holes of the side frame 12 can be improved.

Further, the seat frame 1 includes the upper frame 11 coupling the upper portions of the side frames 12, and the side frame side portion 12A is joined to the upper frame side portion 11A positioned outside in the seat width direction at the upper frame 11. Moreover, the first reinforcement portion 30A is provided at the position at which the side frame side portion 12A and the upper frame side portion 11A overlap with each other. With this configuration, the stiffness of the joint portion between the side frame 12 and the upper frame 11 can be improved.

In addition, the seat frame 1 includes the upper frame 11 forming an upper portion of the seat back frame 10, and the cross member 100 bridged at the upper frame 11. The cross member 100 has the right and left end portions 103, which are fixed to the upper frame 11, in the seat width direction, and the first recessed portion 101 recessed upward or downward between the right and left end portions 103. According to the seat frame 1, the weight of the cross member 100 can be reduced as compared to the case of providing no recessed portion at the cross member 100. With this configuration, the weight of the cross member 100 bridged between the right and left sides of the seat frame 1 can be reduced.

Moreover, in the seat frame 1, the first recessed portion 101 is provided at the center portion of the cross member 100 in the seat width direction. As described above, the first recessed portion is provided at a position facing the occupant, and therefore, a feeling of sitting on the seat can be improved. Further, according to the seat frame 1, the space where a member such as the blower 92 is arranged can be provided in the vicinity of the center portion of the cross member 100.

In addition, in the seat frame 1, the cross member 100 has the reinforcement portion 104 formed at the first recessed portion 101. With this configuration, lowering of the stiffness of the vicinity of the first recessed portion 101 of the cross member 100 can be suppressed.

Moreover, in the seat frame 1, the cross member 100 has the wide portions 105 provided on the right and left sides of the first recessed portion 101 in the seat width direction, and the reinforcement portion 104 is formed across the first recessed portion 101 and both of the wide portions 105. With this configuration, the stiffness of the cross member 100 can be improved.

Further, in the seat frame 1, the cross member 100 is provided with the through-holes (the first through-hole 106, the second through-hole 107). With this configuration, the weight of the cross member 100 can be further reduced.

In addition, in the seat frame 1, the through-holes (the first through-hole 106, the second through-hole 107) are formed at the wide portion 105. The through-holes (the first through-hole 106, the second through-hole 107) are formed at the wide portion 105 as described above, and therefore, larger through-holes can be formed as compared to the case of forming the through-holes at the first recessed portion 101. With this configuration, the weight of the cross member 100 can be further reduced.

Moreover, in the seat frame 1, the through-holes (the first through-hole 106, the second through-hole 107) are formed at the reinforcement portion 104 of the wide portion 105. With this configuration, the weight of the cross member 100 can be reduced, and lowering of the stiffness of the cross member 100 can be also suppressed.

Further, in the seat frame 1, at least part of the wide portion 105 is curved to protrude backward. With this configuration, the stiffness of the cross member 100 can be improved. Moreover, the cross member 100 can be formed in a shape matching the body shape of the occupant, and therefore, the feeling of sitting on the seat can be improved.

In addition, the seat frame 1 has the second recessed portion (the second recessed portion 102A, the second recessed portion 102B) different from the first recessed portion 101, the second recessed portion being provided at least at one of the upper or lower end of the cross member 100. With this configuration, the weight of the cross member 100 can be further reduced. Moreover, a member such as the stop portion 95 of the cover portion 94 can be stopped at the second recessed portion (the second recessed portion 102A, the second recessed portion 102B). Thus, the number of components forming the seat can be reduced. Consequently, the weight of the seat can be reduced.

Further, the seat frame 1 has the flange portion (the first flange portion 108A, the second flange portion 108B) provided at least at one of the upper or lower end of the cross member 100. The flange portion (the first flange portion 108A, the second flange portion 108B) is formed at the position facing the first recessed portion 101 in the upper-to-lower direction. With this configuration, the stiffness of the first recessed portion 101 can be improved.

1: seat frame
10: seat back frame
11: upper frame
11A: upper frame side portion
12: side frame
12A: side frame side portion
12B: side frame rear portion
12C: rear edge
12D: wide portion
12E: flat plate portion
12F: coupling portion
12G: border line
12G1: first line
12G2: second line
12G3: top portion
13: lower frame
13A: rear wall portion
13B: front wall portion
14: cross member
14A: recessed portion
14B: end portion
15: pressure receiving member
15A: support portion
15B: wire
15C: wire
16: rotary shaft
17: headrest attachment portion
18: first coupling bracket
18A: weak portion
18B: shaft through-hole
18C: bolt fastening hole
18D: bolt fastening hole
19: second coupling bracket
19A: weak portion
19B: shaft through-hole
19C: bolt fastening hole
19D: bolt fastening hole
19E: weak portion
20: seat cushion frame
21: pan frame
22A, 22B: cushion side frame
23: coupling pipe (coupling member)
24: pressure receiving member (cushion side pressure receiving member)
30A: first reinforcement portion
30B: second reinforcement portion
30C: third reinforcement portion
30D: rear reinforcement portion
31A: airbag attachment hole (first through-hole, central airbag attachment hole)
31B: airbag attachment hole (upper airbag attachment hole)

-continued

31C: airbag attachment hole (lower airbag attachment hole)
31D: through-hole (second through-hole, first aperture)
31E: through-hole
31F: through-hole
31G: through-hole (third through-hole, second aperture)
40: reclining unit
41: height adjustment unit
50: clip
51: attachment portion
52: welding portion
60A: upper reinforcement portion
60B: upper reinforcement portion
60C: upper reinforcement portion
61A: lower reinforcement portion
61B: lower reinforcement portion
61C: lower reinforcement portion
61D: lower reinforcement portion
61E: lower reinforcement portion
61F: lower reinforcement portion
74: reinforcement portion
75: upwardly-protruding portion
80A: reinforcement portion (first reinforcement portion)
80B: reinforcement portion (third reinforcement portion)
80C: reinforcement portion (third reinforcement portion)
80D: reinforcement portion (fourth reinforcement portion)
80E: reinforcement portion (second reinforcement portion)
81A: reinforcement portion
81B: reinforcement portion
81C: reinforcement portion
82A: reinforcement portion (first reinforcement portion)
82B: reinforcement portion (third reinforcement portion, upper reinforcement portion, front-to-rear extension)
82C: reinforcement portion (fourth reinforcement portion, lower reinforcement portion, front-to-rear extension)
82D: reinforcement portion (second reinforcement portion)
83A: reinforcement portion
83B: reinforcement portion
83C: reinforcement portion
90: attachment member
91: welding portion
92: blower
93: fastener
94: cover portion
95: stop portion
100: cross member
101: first recessed portion
102A: second recessed portion
102B: second recessed portion
103: end portion
104: reinforcement portion
105: wide portion
106: first through-hole
107: second through-hole
108A: first flange portion (flange portion)
108B: second flange portion (flange portion)
T: torso line
V: vertical line

The invention claimed is:

1. A seat frame for a vehicle seat, comprising:

a side frame that is arranged on one side of right and left sides of the seat frame, wherein the side frame includes a side frame side portion that forms a side portion of the side frame, the side frame side portion is provided with a first reinforcement portion that extends in an upper-to-lower direction along a rear edge of the side frame side portion and a plurality of through-holes, the plurality of through-holes includes a plurality of airbag attachment holes for attachment of an airbag unit, the plurality of airbag attachment holes includes an upper airbag attachment hole and a lower airbag attachment hole that is provided below the upper airbag attachment hole, a second reinforcement portion that extends along a front edge of the side frame side portion is provided above the upper airbag attachment hole, a third reinforcement portion that extends in a seat front-to-rear direction is provided at a position separated in a downward direction from the second reinforcement portion in the side frame side portion, the third reinforcement portion is provided to overlap the upper airbag attachment hole in the upper-to-lower direction, the second reinforcement portion and the third reinforcement portion comprise beads that protrude from a surface of the side frame side portion on which the plurality of through-holes are formed, and the second reinforcement portion is provided at a position that does not overlap the upper airbag attachment hole in the seat front-to-rear direction.

2. The seat frame according to claim 1, wherein the third reinforcement portion is provided between the upper airbag attachment hole and the lower airbag attachment hole in the upper-to-lower direction.

3. The seat frame according to claim 2, wherein the third reinforcement portion extends forward beyond the upper airbag attachment hole.

4. The seat frame according to claim 2, wherein the third reinforcement portion is provided at a position that does not overlap the lower airbag attachment hole in the seat front-to-rear direction.

5. The seat frame according to claim 2, wherein the third reinforcement portion is not connected to the first reinforcement portion and is provided independently.

6. The seat frame according to claim 2, wherein a lower end of the first reinforcement portion is bent toward a front of the seat frame.

7. The seat frame according to claim 2, wherein a fourth reinforcement portion that extends in the seat front-to-rear direction is provided at a position separated in the downward direction from the third reinforcement portion in the side frame side portion, and the fourth reinforcement portion is provided at a position that overlaps the lower airbag attachment hole in the seat front-to-rear direction.

8. The seat frame according to claim 1, wherein the third reinforcement portion extends forward beyond the upper airbag attachment hole.

9. The seat frame according to claim 8, wherein the third reinforcement portion is provided at a position that does not overlap the lower airbag attachment hole in the seat front-to-rear direction.

10. The seat frame according to claim 8, wherein the third reinforcement portion is not connected to the first reinforcement portion and is provided independently.

11. The seat frame according to claim 8, wherein a lower end of the first reinforcement portion is bent toward a front of the seat frame.

12. The seat frame according to claim 8, wherein a fourth reinforcement portion that extends in the seat front-to-rear direction is provided at a position separated in the downward direction from the third reinforcement portion in the side frame side portion, and the fourth reinforcement portion is provided at a position that overlaps the lower airbag attachment hole in the seat front-to-rear direction.

13. The seat frame according to claim 1, wherein the third reinforcement portion is provided at a position that does not overlap the lower airbag attachment hole in the seat front-to-rear direction.

14. The seat frame according to claim 1, wherein the third reinforcement portion is not connected to the first reinforcement portion and is provided independently.

15. The seat frame according to claim 1, wherein a fourth reinforcement portion that extends in the seat front-to-rear direction is provided at a position separated in the downward direction from the third reinforcement portion in the side frame side portion, and the fourth reinforcement portion is not connected to the first reinforcement portion and is provided independently.

16. The seat frame according to claim 1, wherein a lower end of the first reinforcement portion is bent toward a front of the seat frame.

17. The seat frame according to claim 16, wherein the fourth reinforcement portion is connected to the first reinforcement portion.

18. The seat frame according to claim 1, wherein a fourth reinforcement portion that extends in the seat front-to-rear direction is provided at a position separated in the downward direction from the third reinforcement portion in the side frame side portion, and the fourth reinforcement portion is provided at a position that overlaps the lower airbag attachment hole in the seat front-to-rear direction.

19. A seat frame for a vehicle seat, comprising:

a seat back frame;

a seat cushion frame; and a reclining unit, wherein the seat back frame includes an upper frame, side frames that forms end portions of the seat back frame in a seat width direction, and a lower frame that couples lower end portions of the side frames with each other, a headrest attachment portion is attached to the upper frame, a pressure receiving member is bridged at a center portion of the seat back frame, the seat cushion frame includes cushion side frames that forms end portions of the seat cushion frame in the seat width direction, a pan frame that forms a front end portion of the seat cushion frame, and a coupling member that couples the cushion side frames with each other, a cushion side pressure receiving member is provided at a center portion of the seat cushion frame, coupling brackets are attached to upper portions of rear end portions of the cushion side frames, the side frames are coupled to the coupling brackets via the reclining unit, the side frame includes a side frame side portion that forms a side portion of the side frame, the side frame side portion is provided with a first reinforcement portion that extends in an upper-to-lower direction along a rear edge of the side frame side portion and a plurality of through-holes, the plurality of through-holes includes a plurality of airbag attachment holes for attachment of an airbag unit, the plurality of airbag attachment holes includes an upper airbag attachment hole and a lower airbag attachment hole that is provided below the upper airbag attachment hole, a second reinforcement portion that extends along a front edge of the side frame side portion is provided above the upper airbag attachment hole, a third reinforcement portion that extends in a seat front-to-rear direction is provided at a position separated in a downward direction from the second reinforcement portion in the side frame side portion, the third reinforcement portion is provided to overlap the upper airbag attachment hole in the upper-to-lower direction, the second reinforcement portion and the third reinforcement portion comprise beads that protrude from a surface of the side frame side portion on which the plurality of through-holes are formed, and the second reinforcement portion is provided at a position that does not overlap the upper airbag attachment hole in the seat front-to-rear direction.

20. A method for manufacturing a seat frame of a vehicle seat, comprising:

preparing a side frame that includes a side frame side portion that forms a side portion of the side frame, the side frame side portion being provided with a first reinforcement portion that extends in an upper-to-lower direction along a rear edge of the side frame side portion and a plurality of through-holes; and arranging the side frame on one side of right and left sides of the seat frame, wherein the plurality of through-holes includes a plurality of airbag attachment holes for attachment of an airbag unit, the plurality of airbag attachment holes includes an upper airbag attachment hole and a lower airbag attachment hole that is provided below the upper airbag attachment hole, a second reinforcement portion that extends along a front edge of the side frame side portion is provided above the upper airbag attachment hole, a third reinforcement portion that extends in a seat front-to-rear direction is provided at a position separated in a downward direction from the second reinforcement portion in the side frame side portion, the third reinforcement portion is provided to overlap the upper airbag attachment hole in the upper-to-lower direction, the second reinforcement portion and the third reinforcement portion comprise beads that protrude from a surface of the side frame side portion on which the plurality of through-holes are formed, and the second reinforcement portion is provided at a position that does not overlap the upper airbag attachment hole in the seat front-to-rear direction.

* * * * *